United States Patent
Dalhat et al.

(10) Patent No.: US 12,221,381 B2
(45) Date of Patent: Feb. 11, 2025

(54) REJUVENATION OF RECLAIMED ASPHALT PAVEMENT

(71) Applicant: Imam Abdulrahman Bin Faisal University, Dammam (SA)

(72) Inventors: Muhammad Abubakar Dalhat, Dammam (SA); Sami Abdullah Osman, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 260 days.

(21) Appl. No.: 17/743,977

(22) Filed: May 13, 2022

(65) Prior Publication Data

US 2023/0365466 A1    Nov. 16, 2023

(51) Int. Cl.
| | | |
|---|---|---|
| C04B 18/20 | (2006.01) | |
| C04B 26/26 | (2006.01) | |
| C04B 111/00 | (2006.01) | |
| C04B 111/10 | (2006.01) | |
| E01C 19/05 | (2006.01) | |

(52) U.S. Cl.
CPC ............. *C04B 18/20* (2013.01); *C04B 26/26* (2013.01); *E01C 19/05* (2013.01); *C04B 2111/0075* (2013.01); *C04B 2111/1075* (2013.01)

(58) Field of Classification Search
CPC . C04B 18/20; C04B 26/26; C04B 2111/0075; C04B 2111/1075; C04B 2111/10; C04B 14/06; C04B 14/14; C04B 14/28; C04B 14/108; C04B 14/285; C04B 18/049; C04B 18/167; E01C 19/05; E01C 7/182
See application file for complete search history.

(56) References Cited

U.S. PATENT DOCUMENTS

| | | |
|---|---|---|
| 9,416,274 B2 | 8/2016 | Frank |
| 10,570,286 B2 | 2/2020 | Williams et al. |
| 2005/0241529 A1* | 11/2005 | Partanen ............... C10G 33/06 106/277 |

(Continued)

FOREIGN PATENT DOCUMENTS

| | | | |
|---|---|---|---|
| CN | 103554936 B | 11/2015 | |
| CN | 106320127 B | 9/2018 | |
| EP | 1740676 B1 * | 2/2011 | ............. C08L 95/00 |

OTHER PUBLICATIONS

H.I. Al-Abdul Wahhab and M.A. Dalhat, "Oil-Sludge Extended Asphalt Mastic Filled with Heavy Oil Fly Ash and Cement Waste for Waterproofing", 2014, The Journal of Engineering Research, vol. 11, No. 2, pp. 27-38. (Year: 2014).*

(Continued)

*Primary Examiner* — Pamela H Weiss
(74) *Attorney, Agent, or Firm* — Oblon, McClelland, Maier & Neustadt, L.L.P.

(57) ABSTRACT

A method of rejuvenating reclaimed asphalt pavement (RAP) is provided. The method includes mixing the RAP with oil sludge, at least one asphalt binder, and at least one aggregate at a temperature of 100-200° C. to form a mixture. The method further includes compacting the mixture to form a rejuvenated paving material. The oil sludge is 60-80 wt. % water, 10-30 wt. % sediments, and 5-30 wt. % hydrocarbon oils based on a total weight of the water, sediments, and hydrocarbon oils.

15 Claims, 17 Drawing Sheets

(56) References Cited

U.S. PATENT DOCUMENTS

2012/0167802 A1 7/2012 Huh

OTHER PUBLICATIONS

Wei Xiao, Xiao Yao, and Fuyang Zhang, "Recycling of Oily Sludge as a Roadbed Material Utilizing Phosphogypsum-Based Cementitious Materials", 2019, Advances in Civil Engineering, vol. 2019, 10 pages. (Year: 2019).*

Isam A.H. Al Zubaidy & Adil K. Al-Tamimi, "Production of sustainable pavement with oil sludge", 2014, Road Materials and Pavement Design, vol. 15, pp. 691-700. (Year: 2014).*

M.A. Dalhat, Sami A. Osman, Nuhu Dalhat Mu'azu, Omar Alagha. "Utilization of oil sludge as rejuvenator in hot-mix-asphalt containing reclaimed asphalt concrete", available online May 3, 2022, Construction and Building Materials, vol. 338, 12 pages. (Year : 2022).*

Zubaidy et al. ("Production of sustainable pavement with oil sludge" in Road Materials and Pavement Design, 2014, pp. 691-700), (Year: 2014).*

Recycling of Oily Sludge as a Roadbed Material Utilizing Phosphogypsum-Based Cementitious Materials in Advances in Civil Engineering, 2019, pp. 1-10 (Year: 2019).*

Wahhab et al. ("Oil-Sludge Extended Asphalt Mastic Filled with Heavy Oil Fly Ash and Cement Waste for Waterproofing" in The Journal of Engineering Research, 2014, pp. 27-38), (Year: 2014).*

Of Use of Modified Fly oil ash to Enhance Asphalt concrete performance. By Hamad I Al Abdul Wahhab, Ibnelwaleed Hussein M A Parvez and Reyad Shawabtch Materials and Structures (2015) 48:3231-3240 (Year: 2015).*

Oil Sludge Extended Asphalt Mastic Filled with Heavy Oil Fly Ash and Cement Waste for Waterproofing by Hamad Al Abdul Wahhab and Muhammad A Dalhat Journal of Engineering Research vol. 11 No. 2 2014 27-38 (Year: 2014).*

The Use of Modified Fly Oil Ash To Enhance Asphalt concrete Preformance Wahhab Hussein Parvez Shawabkeh (Year: 2014).*

Cao, et al. ; Influence of characteristics of recycling agent on the early and long-term performance of regenerated SBS modified bitumen ; Construction and Building Materials, vol. 237 ; Mar. 20, 2020 ; 3 Pages.

Reinke, et al. ; Investigation of Sterol Chemistry to Retard the Aging of Asphalt Binders ; Journal of the Transportation Research Board, No. 2633 ; pp. 127-135 ; 2017 ; 9 Pages.

Fedrigo, et al. ; Flexural strength, stiffness and fatigue of cement-treated mixtures of reclaimed asphalt pavement and lateritic soil ; Road Materials and Pavement Design, vol. 22, No. 5 ; pp. 1004-1022 ; Sep. 4, 2019 ; 20 Pages.

* cited by examiner

REJUVENATION OF RECLAIMED ASPHALT PAVEMENT

BACKGROUND

Technical Field

The present disclosure is directed to asphalt pavement reclamation and more particularly to a method of rejuvenating reclaimed asphalt pavement.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Oil sludge (OS) is a hazardous waste generated by the oil industry during construction and maintenance of oil and gas wells, cleaning or maintenance of oil storage tanks, and accidental oil spills. It is estimated that approximately 60 million metric tons per annum of OS are generated globally. Since OS contains heavy metals, heavy-oil, and other toxic materials, proper disposal of OS is an environmental safety requirement, however conventional OS treatment and disposal methods are expensive.

Few studies have attempted to find alternative ways of disposing or using OS. The successful use of OS as asphalt binder extender for roofing and waterproofing applications is known [H. I. Al-Abdul Wahhab, M. A. Dalhat, Oil-sludge extended asphalt mastic filled with heavy oil fly ash and cement waste for waterproofing, J. Eng. Res. 11 (2014) 27-38]. Potential reduction in asphalt absorption and increase in water resistance of OS-modified mineral filler to be used in asphalt concrete (AC) was also reported [V. E. Kopylov, O. N. Burenina, Physical and Mechanical Properties of Asphalt Concrete Modified with Activated Mineral Powders, IOP Conf. Ser. Mater. Sci. Eng. 753 (2020) 22037]. Further, OS has been utilized as a softening agent to produce a 60/70 penetration grade asphalt from a 5/20 rock asphalt [Y. Astor, A. M. S. Sufanir, W. Z. Utari, The characteristics of Asphalt Concrete-Wearing Course (AC-WC) mixture using Buton Rock Asphalt (BRA) with Oily Sludge (OS) as a rejuvenator, IOP Conf. Ser. Mater. Sci. Eng. 732 (2020) 12029].

Reclaimed Asphalt Pavement (RAP) is a construction waste generated during major rehabilitation of old asphalt pavement. The re-use of RAP back into new or rehabilitated pavement is necessary for achieving sustainable pavement construction. The use of RAP may result in significant cost savings due to a lesser amount of virgin materials needed to produce an AC mix. Studies have also shown that the utilization of RAP reduced overall energy consumption and greenhouse gas emission in pavement construction [Q. Aurangzeb, I. L. Al-Qadi, H. Ozer, R. Yang, Hybrid life cycle assessment for asphalt mixtures with high RAP content, Resour. Conserv. Recycl. 83 (2014) 77-86; H. Jahanbakhsh, M. M. Karimi, H. Naseri, F. M. Nejad, Sustainable asphalt concrete containing high reclaimed asphalt pavements and recycling agents: Performance assessment, cost analysis, and environmental impact, J. Clean. Prod. 244 (2020) 118837; and X. Chen, H. Wang, Life cycle assessment of asphalt pavement recycling for greenhouse gas emission with temporal aspect, J. Clean. Prod. 187 (2018) 148-157].

A rejuvenator is any liquid that revitalizes the old asphalt binder in the RAP. There are several types of rejuvenators commercially available which consist of oily components that come from the crude oil industry, products or byproducts of cracking oil, mineral oil, or bio-oil. Due to the cost associated with the use of commercial rejuvenators, some studies propose the use of waste oils such as waste engine oil (WEO), waste cooking oil (WCO), and residue of castor-oil production, as cheaper alternatives to commercial rejuvenators. However, OS is an optimal alternative as it is a hazardous industrial waste consisting of an emulsion of solids and oil-hydrocarbons. In other words, the WEO and WCO are environmentally less hazardous, thereby easier to dispose of as compared to OS, which makes the alternative use of OS more beneficial. In addition, the OS can be obtained in bulk quantity from a single source such as refineries and similar oil-facilities. This makes large-scale collection of OS for recycling less challenging and economically more feasible than WEO and WCO. As a result, more research towards discovering the potential of OS as a RAP-rejuvenator is desirable.

Accordingly, it is one object of the present disclosure to provide a method of rejuvenating reclaimed asphalt pavement (RAP) using oil sludge as source of oil rejuvenator for RAP, and to evaluate the mechanical properties, and moisture and rutting resistance of AC containing OS-based rejuvenated RAP.

SUMMARY

In an exemplary embodiment, a method of rejuvenating reclaimed asphalt pavement (RAP) is provided. The method comprises mixing the RAP with oil sludge, at least one asphalt binder, and at least one aggregate at a temperature of 100-200° C. to form a mixture. The method further comprises compacting the mixture to form a rejuvenated paving material. Herein, the oil sludge is 60-80 wt. % water, 10-30 wt. % sediments, and 5-30 wt. % hydrocarbon oils based on a total weight of the water, sediments, and hydrocarbon oils.

In one or more exemplary embodiments, the mixture comprises 1-40 wt. % oil sludge, based on a total weight of the RAP.

In one or more exemplary embodiments, the sediments in the oil sludge are at least one selected from a group consisting of sulfur, calcium oxide, iron rust, and copper oxide.

In one or more exemplary embodiments, the sediments in the oil sludge have 1-15 wt. % sulfur, 25-50 wt. % calcium oxide, 5-25 wt. % iron rust, and 5-25 wt. % copper oxide, based on a total weight of the sulfur, calcium oxide, iron rust, and copper oxide.

In one or more exemplary embodiments, the oil sludge comprises at least five elements selected from a group consisting of carbon, hydrogen, oxygen, sulfur, calcium, iron, sodium, magnesium, silicon, chlorine, mercury, copper, bromine, molybdenum, vanadium, cadmium, chromium, lead, zinc, and nickel.

In one or more exemplary embodiments, the oil sludge further comprises 1-8000 mg of nickel per kg of the oil sludge.

In one or more exemplary embodiments, the oil sludge further comprises 1-100 mg of vanadium per kg of the oil sludge.

In one or more exemplary embodiments, the method further comprises mixing the oil sludge with cement to form a cement treated oil sludge prior to mixing with the RAP. In one or more exemplary embodiments, the cement treated oil sludge is 15-40 wt. % cement and 60-85 wt. % oil sludge, based on a total weight of the cement and the oil sludge.

In one or more exemplary embodiments, the method further comprises adding 0-90 wt. % new asphalt concrete to the RAP, based on a total weight of the new asphalt concrete and the RAP, prior to mixing with the oil sludge, the at least one asphalt binder, and the at least one aggregate.

In one or more exemplary embodiments, the at least one asphalt binder is at least one selected from the group consisting of PG58-22, PG64-10, PG64-16, PG64-28, and PG70-10.

In one or more exemplary embodiments, the at least one aggregate is at least one selected from the group consisting of limestone, granite, syenite, diorite, basalt, diabase, gabbro, sandstone, chert, shale, gneiss, schist, slate, quartzite, marble, and serpentine.

In one or more exemplary embodiments, the rejuvenated paving material has a splitting energy of at least 20,000 N-mm.

In one or more exemplary embodiments, Marshall stability of the rejuvenated paving material is at least 10% greater than corresponding ASTM minimum requirement.

In one or more exemplary embodiments, moisture resistance of the rejuvenated paving material is at least 5% greater than corresponding ASTM minimum requirement.

In one or more exemplary embodiments, moisture resistance of the rejuvenated paving material is at least 10% greater than corresponding ASTM minimum requirement.

In one or more exemplary embodiments, fracture energy of the rejuvenated paving material is within 5% of a paving material rejuvenated by the same method but with oil sludge free of sediments.

In one or more exemplary embodiments, rutting resistance of the rejuvenated paving material is at least 10% greater than a paving material rejuvenated by the same method but with oil sludge free of sediments.

In one or more exemplary embodiments, flexibility of the rejuvenated paving material is within 10% of a paving material rejuvenated by the same method but with oil sludge free of sediments.

In one or more exemplary embodiments, the rejuvenated paving material leaches less than 5 mg/L of mercury, cadmium, chromium, lead, copper, nickel, zinc, and/or iron.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
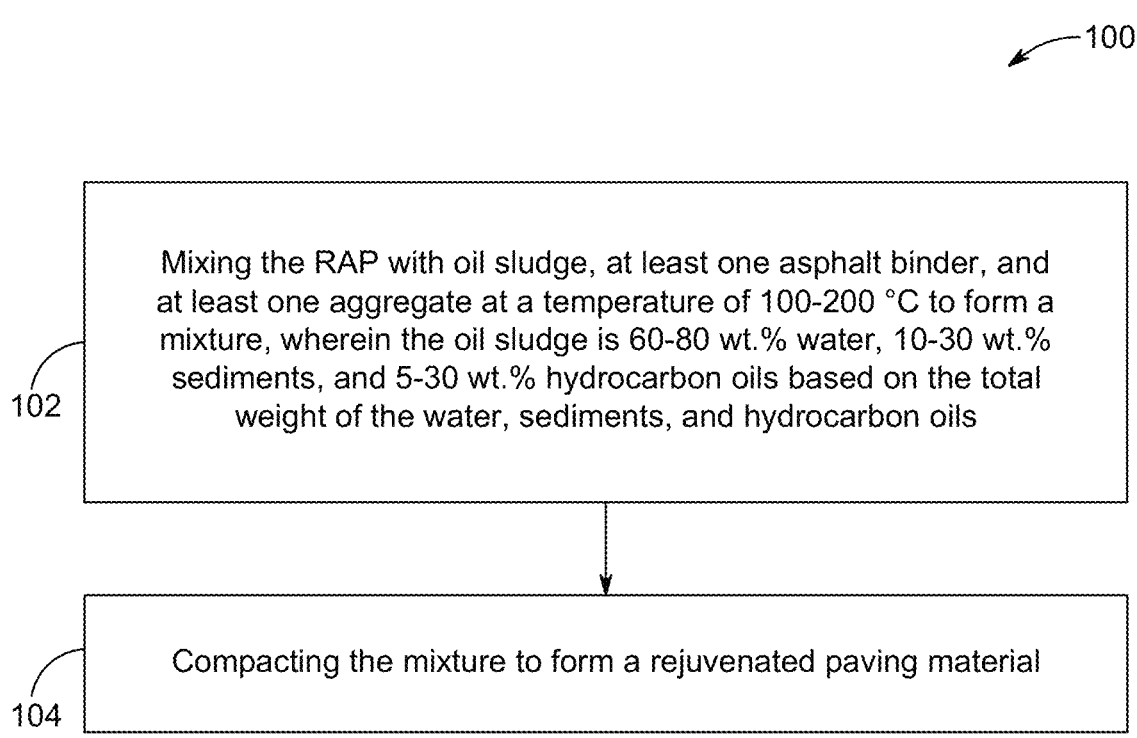
FIG. 1 is an exemplary flowchart of a method of rejuvenating reclaimed asphalt pavement (RAP), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method of rejuvenating reclaimed asphalt pavement (RAP) using oil sludge. The present disclosure evaluates the mechanical properties of RAP rejuvenated with oil sludge and finds that the properties are similar to that or better than pavement rejuvenated with commercial rejuvenators, discussed above. Therefore, it may be appreciated that oil sludge is a potential suitable source of oil rejuvenator for RAP.

Referring to FIG. 1, an exemplary flowchart of a method (referred by reference numeral 100) of rejuvenating reclaimed asphalt pavement (RAP) is illustrated. The order in which the method is described is not intended to be construed as a limitation, and any number of the described method steps may be combined in any order to implement the method. Additionally, individual steps may be removed or skipped from the method without departing from the spirit and scope of the present disclosure.

As used herein, the term "RAP" refers to removed and/or reprocessed pavement materials containing asphalt and aggregates. The RAP is generated when asphalt pavements are removed for reconstruction, resurfacing, or to obtain access to buried utilities. Asphalt pavement is generally removed either by milling or full-depth removal. Milling entails removal of the pavement surface using a milling machine. Full-depth removal involves ripping and breaking the pavement using a rhino horn on a bulldozer and/or pneumatic pavement breakers. It may be appreciated that a considerable amount of waste asphalt concrete mix (or RAP) is generated during such processes. When properly crushed and screened, the RAP consists of high-quality, well-graded aggregates coated by asphalt cement.

For the purposes of the present disclosure, the RAP may be obtained from pavement laid on a road and then passed over by cars and exposed to the sun before it is reclaimed. In an embodiment, new asphalt concrete comprising 1-20 wt. % asphalt cement, preferably 5-15 wt. %, or 10-12 wt. %, and 80-99 wt. % aggregates, preferably 85-95 wt. %, or 90-92 wt. %, based on the total weight of the asphalt cement and aggregates, is heated to a temperature of 200-300° C., preferably 220-280° C., or 240-260° C., and deposited on a substrate as paving. Also, in an embodiment, the paving is compacted with at least 1.5 MPa, preferably 1.5-5 MPa, or 2-3 MPa, of pressure exerted by a steel-wheeled roller. Further, in an embodiment, the paving is further subjected to at least 1,000, preferably 1,000-100,000, 10,000-90,000, 20,000-80,000, 30,000-70,000, or 40,000-60,000 cycles of compaction of at least 200 kPa, preferably 200-1,000 kPa, 300-900 kPa, 400-800, kPa, or 500-600 kPa such as but not limited to, compaction by cars, trucks and/or buses. Furthermore, in an embodiment, the paving is exposed to UV radiation from the sun and temperatures from −20 to 110° C., preferably −10-100° C., 0-90° C., 10-80° C., 20-70° C., 30-60° C., 40-50° C. Also as per embodiments of the present disclosure, the paving is then reclaimed by breaking the paving using a rhino horn on a bulldozer and/or a pneumatic pavement breaker. Further, in an embodiment, the reclaimed paving is then pulverized.

Recycling asphalt pavement creates a cycle of reusing materials that optimizes the use of natural resources. The RAP is a useful alternative to virgin materials because it reduces the need to use virgin aggregate, which is a scarce commodity in many regions. It also reduces the amount of costly new asphalt binder required in the production of asphalt paving mixtures. There has been a growing effort to support and promote the use of RAP in pavement construction in an effort to reduce waste, preserve the natural environment, and provide a cost effective material for constructing highways and the like. Reusing the RAP in pavement construction requires appropriate treatment to soften the oxidatively aged hard asphalt binders. The present method 100 allows for rejuvenating the RAP so that the recycled asphalt pavements constructed therefrom are cost effective, environmentally responsible, and provide adequate performance.

At step 102, the method 100 comprises mixing the RAP with oil sludge, at least one asphalt binder, and at least one aggregate at a temperature of 100-200° C., preferably 120-180° C., 140-160° C., or approximately 150° C. to form a mixture. The oil sludge (OS) is generally a waste product that usually accumulates at the bottom of crude oil storage tanks or separation vessels. For instance, in the petroleum refineries, oil sludge accumulates from refining processes. The oil sludge usually contains high percentage of oily fractions and is thus suitable to be used to rejuvenate the RAP.

In the present embodiments, the oil sludge is 60-80 wt. % water, preferably 65-75 wt. %, or approximately 70 wt. %, 10-30 wt. % sediments, preferably 15-25 wt. %, or approximately 20 wt. % and 5-30 wt. % hydrocarbon oils, preferably 10-25 wt. %, or 15-20 wt. %, based on a total weight of the water, sediments, and hydrocarbon oils. In some embodiments, the sediments in the oil sludge are at least one selected from a group consisting of sulfur, calcium oxide, iron rust, and copper oxide. In an embodiment, the sediments in the oil sludge have 1-15 wt. % sulfur, preferably 3-13 wt. %, 5-10 wt. %, or 7-9 wt. %, 25-50 wt. % calcium oxide, preferably 30-45 wt. %, or 35-40 wt. %, 5-25 wt. % iron rust, preferably 10-20 wt. %, or 12-15 wt. %, and 5-25 wt. % copper oxide, preferably 10-20 wt. %, or 12-15 wt. %, based on a total weight of the sulfur, calcium oxide, iron rust, and copper oxide.

In some embodiments, the oil sludge comprises at least five elements selected from a group consisting of carbon, hydrogen, oxygen, sulfur, calcium, iron, sodium, magnesium, silicon, chlorine, mercury, copper, bromine, molybdenum, vanadium, cadmium, chromium, lead, zinc, and nickel. It may be appreciated by a person skilled in the art that some of the elements, such as oxygen, sulfur, calcium, sodium, etc., may be a part of resins present in the crude oil, which, in turn, is usually the source of the oil sludge. Further, other elements, such as nickel, vanadium, iron, etc., may be part of asphaltenes (which are poorly polymerized compounds of high molecular weight), also present in the crude oil. In an embodiment, the oil sludge comprises 1-8000 mg of nickel per kg of the oil sludge, preferably 100-5000 mg/kg, 500-2000 mg/kg, or 1000-1500 mg/kg. In some embodiment, the oil sludge comprises 1-100 mg of vanadium per kg of the oil sludge, preferably 10-90 mg/kg, 20-80 mg/kg, 30-70 mg/kg, or 40-60 mg/kg.

Such composition for the oil sludge may generally correspond to naturally existing composition of raw oil sludge as may be obtained from processing of crude oil in oil refineries, and thus the utilized oil sludge as per the embodiments of the present disclosure may be easily and economically available for the purpose of rejuvenating the RAP.

The asphalt binder generally includes a large number of chemical compounds that may all be different in their chemical structures. These compounds in an asphalt binder are known to exist in a well-dispersed state by forming an emulsion. In particular, the asphalt binder may behave like a homogeneous liquid at a high temperature by forming an emulsified structure. The asphalt binder is used in the intermediate and surface layers of flexible pavement to provide tensile strength to resist distortion, protect the asphalt pavement structure and subgrade from moisture, and provide a smooth, skid-resistant riding surface that withstands wear from traffic. In some embodiments, the at least one asphalt binder is selected from the group consisting of PG58-22, PG64-10, PG64-16, PG64-28, and PG70-10. It may be understood by a person skilled in the art that the given examples are based on standard notation for asphalt binders, which is in the form of PGXX-YY, where XX is the average-seven day maximum pavement design temperature and YY is the minimum pavement design temperature. The listed types of asphalt binders are well known and widely available, and thus may be suitable to be utilized for purposes of the present disclosure.

The aggregate may be selected for asphalt paving applications based on a number of criteria, including physical properties, compatibility with the RAP to be used in the construction process, availability, and ability to provide a finished pavement that meets the performance specifications of the pavement layer for the traffic projected over the design life of the project. In general, the aggregate may be added to the asphalt product to modify its rheology and temperature susceptibility. In some embodiments, the at least one aggregate is at least one selected from the group consisting of limestone, granite, syenite, diorite, basalt, diabase, gabbro, sandstone, chert, shale, gneiss, schist, slate, quartzite, marble, and serpentine. Again, the listed types of aggregates are well known and widely available, and thus may be suitable to be utilized for purposes of the present disclosure.

As mentioned above, the RAP, the oil sludge, the asphalt binder, and the aggregate are mixed at the temperature of 100-200° C. to form the mixture. In some embodiments, the RAP, the asphalt binder, and the aggregate may be put together in a heating source, such as an oven, at a lower temperature for a certain time period, and then subsequently the temperature may be increased to 100-200° C. prior to mixing. In particular, the RAP may be mixed with a predetermined amount of the oil sludge for a minimum mixing duration. The rejuvenated RAP may then be returned back to the oven for a certain time period before mixing with the aggregate and the asphalt binder. Thereafter, the rejuvenated RAP, the asphalt binder, and the aggregate may be mixed according to conventional preparation method. In an example, the mixture may further be cured (before compacting, as discussed later) for a certain time period. The high temperature mixing of the RAP and curing of the rejuvenated-RAP is done to ensure sufficient diffusion of the oil sludge into the RAP [T. Ma, X. Huang, Y. Zhao, Y. Zhang, Evaluation of the diffusion and distribution of the rejuvenator for hot asphalt recycling, Constr. Build. Mater. 98 (2015) 530-536, incorporated herein by reference in its entirety].

In some embodiments, the mixture comprises 1-40 wt. % oil sludge, preferably 10-30 wt. %, or 20-25 wt. % based on a total weight of the RAP. In particular, the role of the oil sludge, which acts as a rejuvenator, is to soften the hardened RAP; or specifically, to soften the hardened old asphalt binder in the RAP. Therefore, it may be appreciated that the higher the content of the RAP in the formed mixture, the higher amount of the oil sludge is needed to soften the hardened RAP for rejuvenation thereof.

In an embodiment, the method further comprises mixing the oil sludge with cement to form a cement treated oil sludge (CT-OS) prior to mixing with the RAP. In an embodiment, the cement is Type 1 Ordinary Portland Cement (OPC). The mixing may be done at a high temperature in a range of 100-200° C., preferably 120-180° C., or 140-160° C. In an embodiment, the cement treated oil sludge is 15-40 wt. % cement, preferably 20-35 wt. %, or 25-30 wt. % and 60-85 wt. % oil sludge, preferably 65-80 wt. %, or 70-75 wt. % based on a total weight of the cement and the oil sludge. The mixing of the cement and the oil sludge may be done by manual methods or mechanical tools/machines, without any limitations.

In an embodiment, the method further comprises adding 0-90 wt. % new asphalt concrete to the RAP, preferably 10-80 wt. %, 20-70 wt. %, 30-60 wt. %, 40-50 wt. %, based on a total weight of the new asphalt concrete and the RAP, prior to mixing with the oil sludge, the at least one asphalt binder, and the at least one aggregate. In some embodiments, the new asphalt concrete (i.e., virgin asphalt concrete) may be mixed with the RAP in order to stabilize and make the RAP compatible with the traditional construction practices. Since the RAP may be obtained from any number of old pavement sources, the quality of the RAP may vary. Excess granular material or soils, or even debris, may sometimes be introduced into old pavement stockpiles and that may affect the properties of the RAP. Also, the number of times the pavement has been resurfaced, the amount of patching and/or crack sealing, and the possible presence of prior seal coat applications may all have an influence on properties of the RAP. Therefore, the percentage by weight of the new asphalt concrete may be selected based on properties of the available RAP, such that the obtained RAP may have suitable a composition for further mixing with the oil sludge, the asphalt binder, and the aggregate as per the embodiments of the present disclosure.

At step 104, the method 100 comprises compacting the mixture to form a rejuvenated paving material. The compaction is achieved by any process known in the art including mechanical and vibrational compaction. The formed rejuvenated paving material may be used in a number of construction applications. These applications include using the rejuvenated paving material as an aggregate substitute and asphalt cement supplement in recycled asphalt paving (hot mix or cold mix), as a granular base or subbase, stabilized base aggregate, or as an embankment or fill material.

In an embodiment, the rejuvenated paving material, as formed using the techniques of the present method 100, has a splitting energy of at least 20,000 N-mm. For purposes of the present disclosure, the splitting energy may be used to evaluate low temperature performance of the rejuvenated paving material from the perspective of energy. The splitting energy may be obtained by processing the load and displacement data collected by the splitting test machine. In particular, the splitting energy may be calculated as the area under the load-deformation curve of an Indirect Tensile Strength (ITS) test. It may be appreciated by a person skilled in the art that greater the splitting energy (i.e., the energy required for the destruction of the rejuvenated paving material), the better the low temperature performance of the rejuvenated paving material when used, for example, in applications to form asphalt mixture or the like.

In an embodiment, the Marshall stability of the rejuvenated paving material is at least 10%, preferably 20%, 30%, 40%, 50%, 60%, 70, 80%, 90%, or 100% greater than the corresponding ASTM minimum requirement. For purposes of the present disclosure, Marshall stability is related to the resistance of the rejuvenated paving material to distortion, displacement, rutting and shearing stresses. The Marshall stability is derived mainly from internal friction and cohesion, where cohesion is the binding force of binder material, while internal friction is the interlocking and frictional resistance of aggregates. In particular, the Marshall stability of the mix is defined as a maximum load carried by a compacted specimen of the rejuvenated paving material at a standard test temperature of 60° C., where the flow is measured as the deformation in units of 0.25 mm between no load and maximum load carried by the specimen during stability test. It may be appreciated that the rejuvenated paving material, when used for pavement application, is subjected to severe traffic loads, and it may be necessary to adopt the rejuvenated paving material with high stability and flow, as determined by the Marshall stability thereof. In an example, the ASTM minimum requirement for the Marshall stability may be defined in ASTM Volume 04.03: Road and Paving Materials; Vehicle-pavement Systems.

In an embodiment, the moisture resistance of the rejuvenated paving material is at least 5%, preferably 20%, 30%, 40%, 50%, 60%, 70, 80%, 90%, or 100% greater than corresponding ASTM minimum requirement. For purposes of the present disclosure, the moisture resistance is defined as ability of the rejuvenated paving material to prevent formation of a film on the aggregate surfaces. The moisture resistance is an important criterion as lower moisture resistance of the rejuvenated paving material may cause a failure of the surface of the pavement.

In an example, the ASTM minimum requirement for the moisture resistance may be defined in ASTM Volume 04.03: Road and Paving Materials; Vehicle-pavement Systems.

In another embodiment, the moisture resistance of the rejuvenated paving material when rejuvenated with CT-OS, is at least 10%, preferably 20%, 30%, 40%, 50%, 60%, 70, 80%, 90%, or 100%, greater than corresponding ASTM minimum requirement. This is due to the strengthening effect of the cement in the CT-OS due to hydro-curing manifested at higher RAP content, as previous research has shown that small amount of cement can significantly boost the moisture resistance of AC mixtures [A. E. A. E.-M. Behiry, Laboratory evaluation of resistance to moisture damage in asphalt mixtures, Ain Shams Eng. J. 4 (2013) 351-363, incorporated herein by reference in its entirety].

In an embodiment, the fracture energy of the rejuvenated paving material is within 5%, preferably 3% or 1%, of a paving material rejuvenated by the same method but with oil sludge free of sediments. For purposes of the present disclosure, the fracture energy is defined as the energy required to change a unit area of a fracture surface from its initial unloaded state to a state of complete separation.

In an embodiment, the rutting resistance of the rejuvenated paving material, rejuvenated with CT-OS, is at least 10%, preferably 20%, 30%, 40%, 50%, 60%, 70, 80%, 90%, or 100%, greater than a paving material rejuvenated by the same method but with oil sludge free of sediments. Rutting, or permanent deformation, is one of the common forms of pavement distress and is principally caused by repetitive deformation due to traffic loading. For purposes of the present disclosure, the rutting resistance is defined as resistance to deformation under repetitive loading. The rutting resistance of the asphalt material is usually characterized by the rutting factor $G^*/\sin \delta$, and the higher the rutting factor, the smaller the flow deformation and the more resistance to rutting, where '$G^*$' is the complex modulus and '$\delta$' is the phase angle of the asphalt specimen as may be measured by Dynamic Shear Rheometer (DSR) test.

In an embodiment, the flexibility of the rejuvenated paving material is within 10%, preferably 5%, or 1%, of a paving material rejuvenated by the same method but with oil sludge free of sediments. For purposes of the present disclosure, the flexibility, also sometimes referred to as "fracture resistance," of the rejuvenated paving material may be defined as resistance to cracking or fracturing under constant loading. Semi-circular bending (SCB) fracture test may be employed to analyze the fracture resistance of the formed RAP containing asphalt concrete mixture.

In an embodiment, the rejuvenated paving material leaches less than 5 mg/L, preferably 4 mg/L, 3 mg/L, 2 mg/L, 1 mg/L, or none, of mercury, cadmium, chromium, lead, copper, nickel, zinc, and/or iron. Leaching of heavy metals (Hg, Cd, Cr, Pb, Cu, Ni, Zn and Fe) is a potential concern due to possible harm cause to the environment.

EXAMPLES

Figure 2:
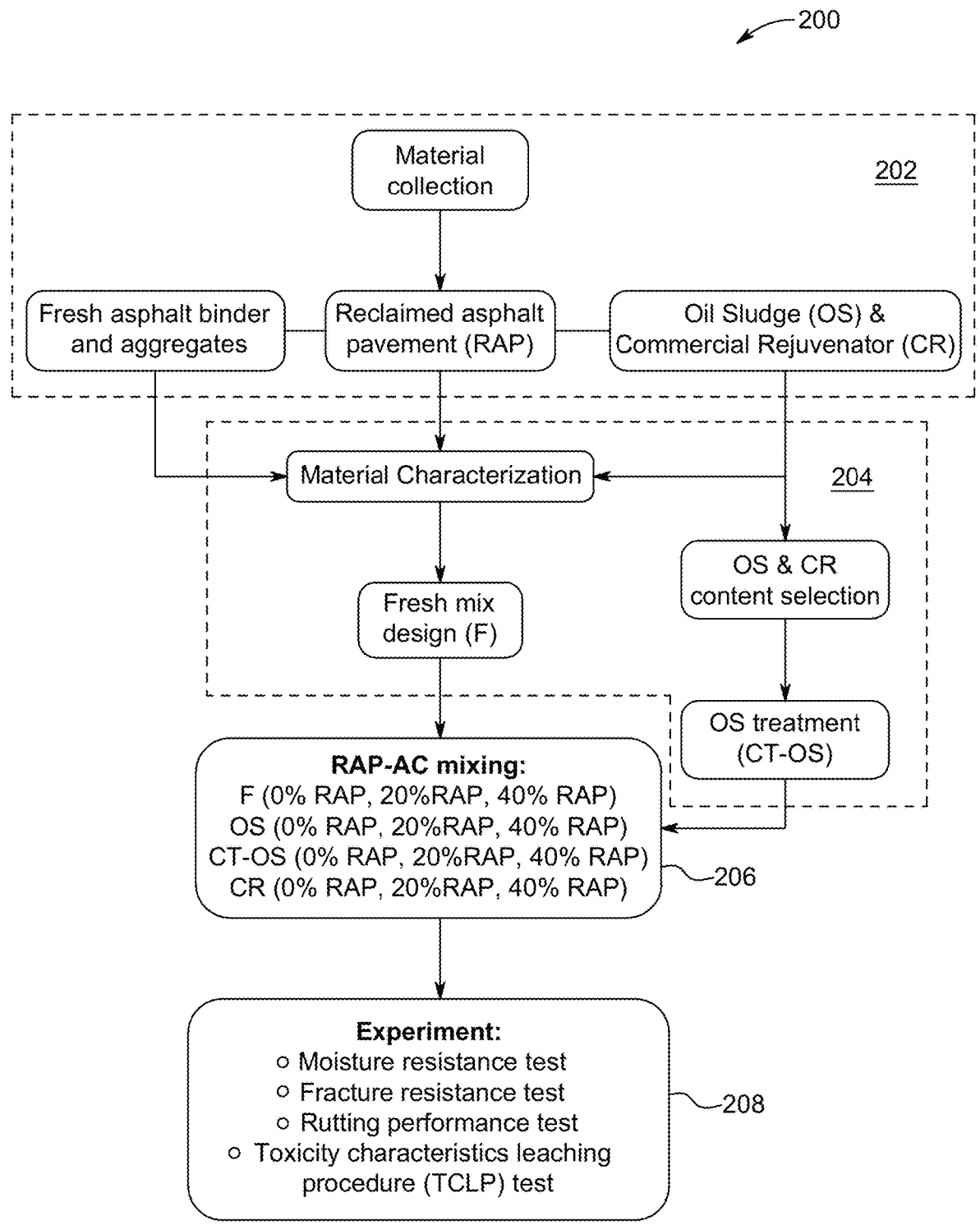
FIG. 2 is a simplified process flow diagram for rejuvenating the RAP, according to certain embodiments.

Referring to FIG. 2, illustrated is an exemplary process flow diagram (generally referred by reference numeral 200) summarizing steps and experimental procedures followed for performing experiments and analyzing results as per embodiments of the present disclosure, from collection of materials, characterization of materials, mix design of control AC, selection of rejuvenators content, OS treatment, RAP-AC mixing, to experimental tests and analysis.

As shown in block 202, asphalt binder, aggregates, OS, and RAP were collected. The fresh asphalt binder 64-10 performance grade (PG) was used and had penetration grade of 60/70, rotational viscosity of 450±10 cP at 135° C., flash point of 345±5° C., and ductility above 150 cm at 25° C. The specific gravity (SG) and other properties of the fine and coarse virgin aggregates (FA and CA) are presented in Table 1 below. The aggregates in the fresh mix and that in the RAP were limestone-type commonly, as found in Eastern Province (EP) of Saudi Arabia. Both the asphalt binder and the fresh aggregate were collected from Al-Yamama asphalt mix plant. The RAP was a product of mill and pavement maintenance of King Saud Road at Khobar, which was conducted in 2019. The pavement had suffered from severe distresses of longitudinal and transverse cracking after approximately 10 years of services. The road was constructed using the local asphalt binder grade (PG 64-10) and limestone aggregate. A solvent and centrifuge extraction method (ASTM D 2172) was used to determine the gradation and asphalt content of the RAP. The average asphalt binder content of the RAP was estimated to be 5.5±0.5%. The gradation of the RAP, fresh-mix, and their combination (20% and 40% RAP) are summarized in Table 2 below. Proportion of the various sizes of the fresh aggregate in the RAP-AC mix was controlled to maintain similar gradation as that of the fresh AC. This was necessary to minimize the influence of difference in gradation on the RAP content. Marshall mix design and 75 number of blows/face was employed to optimize the asphalt content [AASHTO: T245, Standard Method of Test for Resistance to Plastic Flow of Asphalt Mixtures Using Marshall Apparatus, Am. Assoc. State Highw. Transp. Off. (2019), incorporated herein by reference in its entirety].

TABLE 1

| Aggregate properties | | | |
|---|---|---|---|
| Properties | Values | Criteria | Standard |
| Bulk Specific Gravity FA | 2.645 | — | ASTM C128 |
| SSD Bulk Specific Gravity FA | 2.660 | — | ASTM C128 |
| Apparent Specific | 2.685 | — | ASTM C128 |
| Water Absorption FA (%) | 3.912 | — | ASTM C128 |
| Gravity FA | | | |
| Bulk Specific Gravity CA | 2.499 | — | ASTM C127 |
| SSD Bulk Specific Gravity CA | 2.567 | — | ASTM C127 |

TABLE 1-continued

Aggregate properties

| Properties | Values | Criteria | Standard |
|---|---|---|---|
| Apparent Specific Gravity CA | 2.682 | — | ASTM C127 |
| Water Absorption CA (%) | 2.729 | — | ASTM C127 |
| Los Angeles Abrasion (%) | 28.0 | ≤45 | ASTM C 131 |
| Impact Value (%) | 10.5 | <30 | BS_EN_109 7-2 |

TABLE 2

Asphalt concretes mix gradation

| Fresh | Fresh + 20% RAP | Fresh + 40% RAP | 100% RAP | Control Points Min | Max |
|---|---|---|---|---|---|
| 99.8 | 99.8 | 99.8 | 100.0 | 100 | — |
| 92.5 | 92.4 | 92.3 | 99.2 | 90 | 100 |
| 78.5 | 77.9 | 81.2 | 96.9 | — | 90 |
| 72.5 | 69.0 | 69.7 | 78.7 | — | — |
| 53.1 | 51.8 | 49.0 | 57.9 | 28 | 58 |
| 48.1 | 47.4 | 44.4 | 52.9 | — | — |
| 23.8 | 26.0 | 26.0 | 32.4 | — | — |
| 20.4 | 22.2 | 22.3 | 25.5 | — | — |
| 11.2 | 12.4 | 12.5 | 15.7 | — | — |
| 2.8 | 3.2 | 3.2 | 5.6 | 2 | 10 |
| 0.0 | 0.0 | 0.0 | 0.0 | — | — |

Further, for collecting the rejuvenators, crude OS was obtained from Saudi Aramco refinery at Rastanura in the EP of Saudi Arabia. The raw OS contained approximately 69% water, 23% sediments and 8% hydrocarbon oils. The OS was first dehydrated and washed with carbon disulfide ($CS_2$) to estimate the oil sediment fractions. The dehydrated OS consisted of 4.51% sulfur (ASTM D4294), 35.5% calcium oxide (CaO), 15.8% iron rust ($Fe_2O_3$) and 18.5% copper oxide (CuO) (ASTM D 6481). The nickel and vanadium concentrations were approximately 5695 and 38 mg/kg respectively (ASTM D6481). The oily composition of the dehydrated OS was approximately 25.7%. A modified OS was obtained by mixing the OS with 25% by weight of Type I Ordinary Portland Cement (OPC) (SG=3.15). The mixing was done at 140° C. using manual stirring with a spatula in a 1000 mL glass beaker. The modified OS is termed the Cement Treated Oil Sludge (CT-OS). A petroleum base Commercial Rejuvenator (CR) was sourced locally and utilized as further reference. The choice of the petroleum base CR as a reference rejuvenator was based on crude-oil fraction as opposed to the OS. It may be understood that some other previous studies have also utilized petroleum-oil as reference rejuvenator [Mamun et al (2018); A. Mokhtari, H. David Lee, R. C. Williams, C. A. Guymon, J. P. Scholte, S. Schram, A novel approach to evaluate fracture surfaces of aged and rejuvenator-restored asphalt using cryo-SEM and image analysis techniques, Constr. Build. Mater. 133 (2017) 301-313, incorporated herein by reference in their entirety]. The basic properties of the CR are summarized in Table 3 below. Further, the contents of the OS and CR rejuvenators were selected based on splitting energy (SE) of 100% RAP mixture. The SE was calculated as the area under the load-deformation curve of the ITS test. Appropriate corrections were applied to the SE to account for the slight variation in heights of the samples. The amount of OS and CR rejuvenators that corresponded with the maximum SE of the 100% RAP were selected for further evaluation (as discussed later in reference to FIG. 7).

TABLE 3

Basic properties of the CR

| Density @ 15° C. (g/cm³) | Viscosity @ 100° C. (cP) | Flash Point (° C.) | Sulphate Ash Content (%) | Total Base Number |
|---|---|---|---|---|
| 0.892 | 16.2 | 225.9 | 0.81 | 5.8 |

Figure 3A:
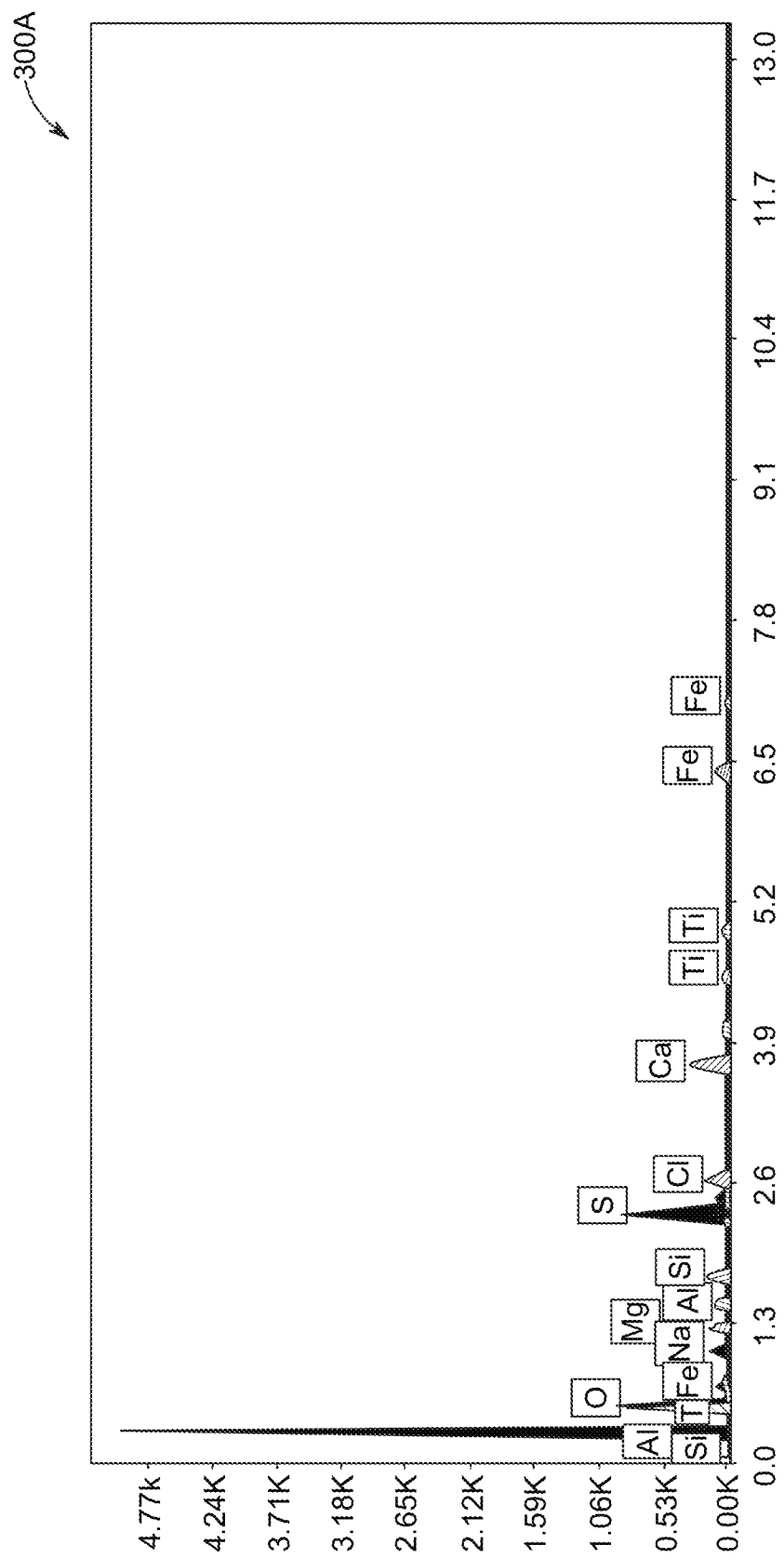
FIG. 3A illustrates a graph providing EDX result for raw oil sludge, according to certain embodiments.

Further, as shown in block 204, the raw OS was characterized using Fourier transform-IR (FTIR, Shimadzu operated at resolution 4 $cm^{-1}$) and elemental composition analyzer. FIG. 3A provides an EDX spectrum of OS (represented as a graph with reference numeral 300A) which indicates that predominate elements in the OS consisted of O, S, Ca, Fe, Na, Mg, Si, Cl and Fe. However, other elements such as Hg, Cu, Br, Mo, and Ni were also present in lower proportions.

Figure 3B:
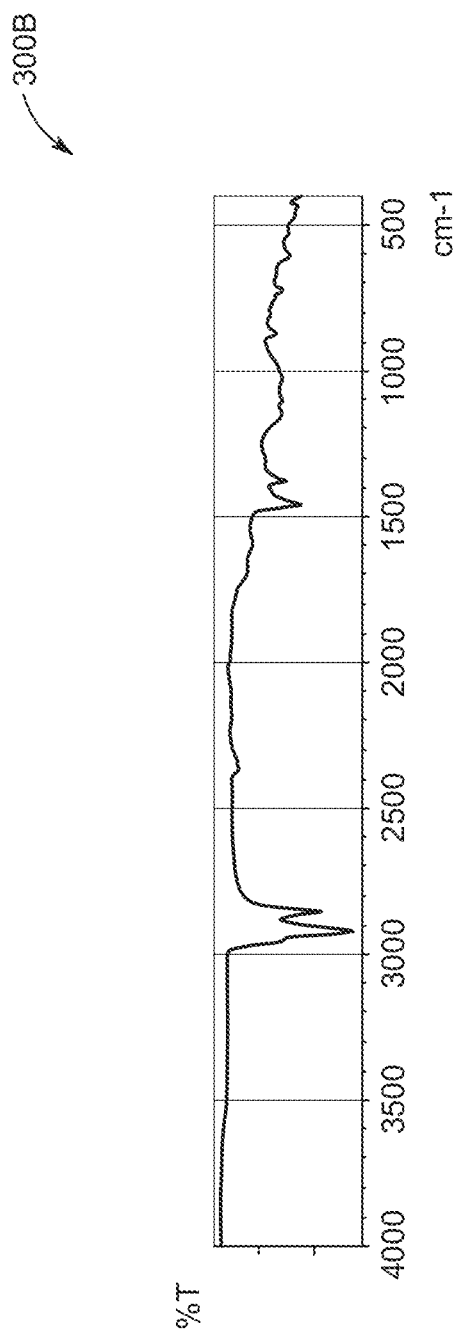
FIG. 3B illustrates a graph providing FTIR spectrum results for raw oil sludge, according to certain embodiments.

FIG. 3B provides an FTIR spectrum of OS (represented as a graph with reference numeral 300B) which indicates clear peaks located at 2920, 2850, 1456, 1375, 874, 720, 607 $cm^{-1}$ with small peaks at 2369, 1157 $cm^{-1}$. The peaks between 2800-3000 $cm^{-1}$ covers the hydrogen-bonded hydroxyl (OH) groups while the peak around 1500 $cm^{-1}$ is for stretching vibrations for adsorbed water molecules [N. D. Mu'azu, N. Jarrah, M. Zubair, M. S. Manzar, T. S. Kazeem, A. Qureshi, S. A. Haladu, N. I. Blaisi, M. H. Essa, M. A. Al-Harthi, Mechanistic aspects of magnetic MgAlNi barium-ferrite nanocomposites enhanced adsorptive removal of an anionic dye from aqueous phase, J. Saudi Chem. Soc. 24 (2020) 715-732, incorporated herein by reference in its entirety]. Further, as may be seen, the interlayer stretching vibrations for nitrate anions are assigned to the 1375 $cm^{-1}$ sharp peak. Meanwhile, the C—O—C bond stretching vibration are attributed to the peak at 1157-1000 $cm^{-1}$. Also, below 1000 $cm^{-1}$, the observed peaks indicate the stretching vibrations ascribed to Al—O, O-metal-O, and C—O [Mu'azu et al. (2020)]. As may be appreciated by a person skilled in the art, these confirmed OS functional groups corroborate well with the EDX analysis.

Referring back to FIG. 2, as shown in block 206, RAP and AC were mixed with rejuvenators in different proportions. For this purpose, fresh aggregate, asphalt binder, and the RAP were put together in the oven at 150° C. for at least 3 hours. The temperature was increased to 165° C. 1 hour prior to mixing. The fresh aggregate AC mixtures were mixed according to conventional AC preparation method (Aggregate+binder). For AC containing RAP, the RAP was first mixed with the predetermined amount of the rejuvenator for a minimum mixing duration of 2 minutes. The rejuvenated RAP was then returned back to the oven for at least 30 minutes before mixing with fresh aggregate and asphalt binder. This sequence of mixing has been shown to eliminate the effect of rejuvenator-type on the mix volumetric properties [Z. Xie, H. Rizvi, C. Purdy, A. Ali, Y. Mehta, Effect of rejuvenator types and mixing procedures on volumetric properties of asphalt mixtures with 50% RAP, Constr. Build. Mater. 218 (2019) 457-464, incorporated herein by reference in its entirety]. The 100% RAP samples were immediately compacted after the initial 30 minutes curing. All other AC mixtures were further cured at 150° C. for another 30 minutes before compaction. The high temperature mixing of the RAP and curing of the rejuvenated-RAP was to ensure sufficient diffusion of the various rejuvenators into the RAP [T. Ma, X. Huang, Y. Zhao, Y. Zhang, Evaluation of the diffusion and distribution of the rejuvenator for hot asphalt recycling, Constr. Build. Mater. 98 (2015) 530-536, incorporated herein by reference in its entirety]. Final curing of the AC mix was to allow the absorption of fresh-asphalt and rejuvenated asphalt into the reclaimed and fresh aggregates.

As shown in block 208, different tests were carried out to determine characteristics of formed mixtures. In particular, the tests included moisture resistance test, fracture resistance test, rutting performance test, and Toxicity Characteristics Leaching Procedure (TCLP) test, as described hereinafter.

Moisture Resistance Test

The moisture resistance of the various RAP containing ACs was assessed using retained Marshall stability [AASHTO: T245 (2019)]. A set of 3 samples were saturated and conditioned at 60° C. in water bath for 35 minutes prior to measuring their stability. Another set of 3 samples of the same AC-mix were subjected to saturation and conditioning at 60° C. in water bath for 24 hours. The stabilities of the second set of samples were measured and corrected according to the heights of the samples. If the average corrected stability of the first set of samples is $MS_o$ and the average corrected stability of the second set of samples is $MS_f$, then retained stability (RS) is given by equation (1) below.

$$RS = \frac{MS_f}{MS_o} \times 100 \quad (1)$$

Fracture Resistance Test

Figure 4B:
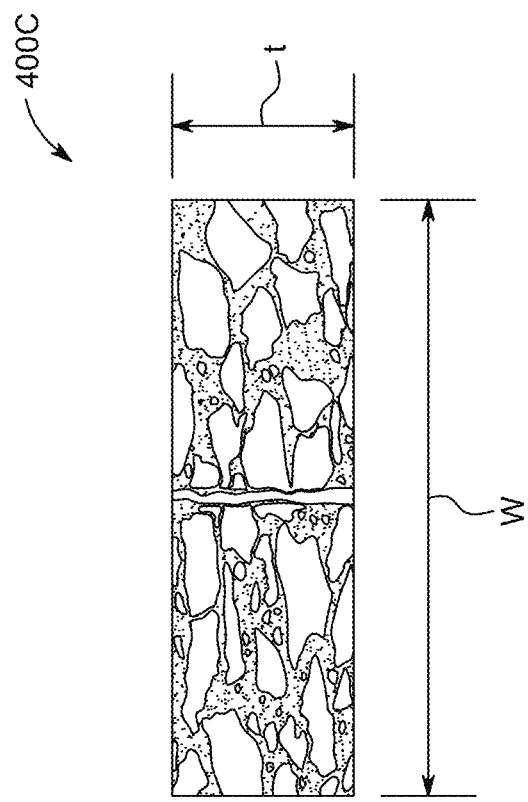
FIG. 4B illustrates a second view of the sample for conducting the Semi-Circular Bending fracture test, according to certain embodiments.
Figure 4C:
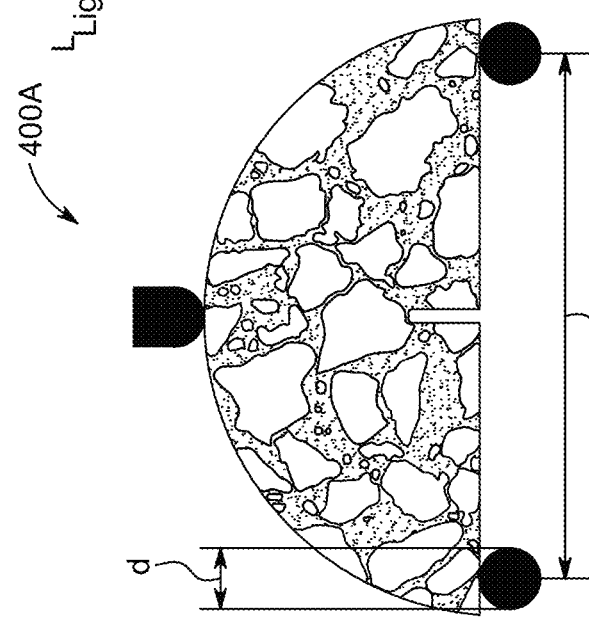
FIG. 4C illustrates a third view of the sample for conducting the Semi-Circular Bending fracture test, according to certain embodiments.
Figure 4A:
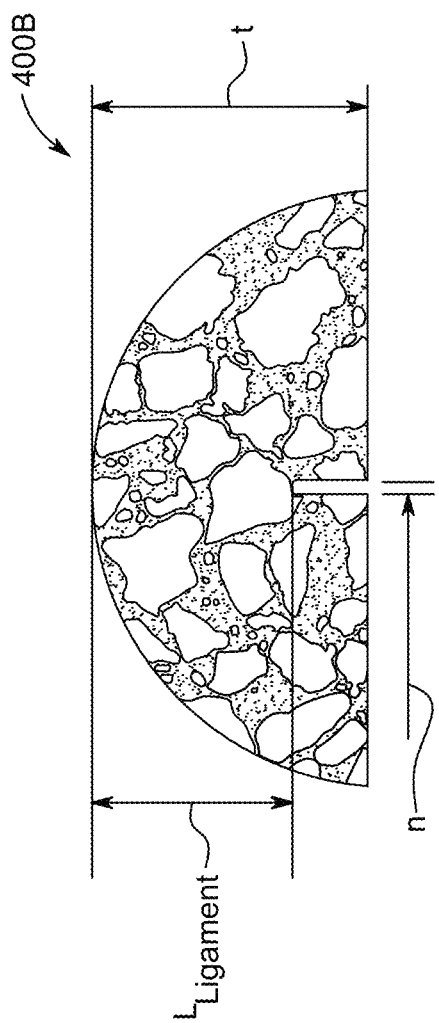
FIG. 4A illustrates a first view of a sample for conducting a Semi-Circular Bending fracture test, according to certain embodiments.

Semi-circular bending (SCB) fracture test was employed to analyze the fracture resistance of the RAP containing AC mixtures. FIGS. 4A-4C depict schematics of the SBC set-up and average dimensions of the sample. As shown in sample view 400A of FIG. 4A, the cylindrical circular supports had a diameter 'd' of 20 mm, and distance 'D' between the cylindrical circular supports was 80 mm. Further, as shown in sample views 400A, 400B of FIGS. 4B and 4C, average ligament length '$L_{ligament}$' of samples was 40 mm, which makes the average notch height to be 10 mm. The thickness of the sample is denoted by 't' and is approximately 50 mm. The sample had a width 'TW' of 101.6 mm, and a fracture with width 'n' of 1.5 mm. The test was performed on 4 sample replicates for each AC mix. All prepared samples were dipped in water for 1 minute and were then allowed to dry at room temperature for 3 days. This was done to activate the curing of OPC in the AC mix that was rejuvenated with CT-OS. Actual dimensions of each sample were measured from at least 2 different locations using a digital vernier caliper, and the averages were recorded. The fracture test was conducted at 18±1° C. under a loading rate of 50 mm/min.

Figure 5:
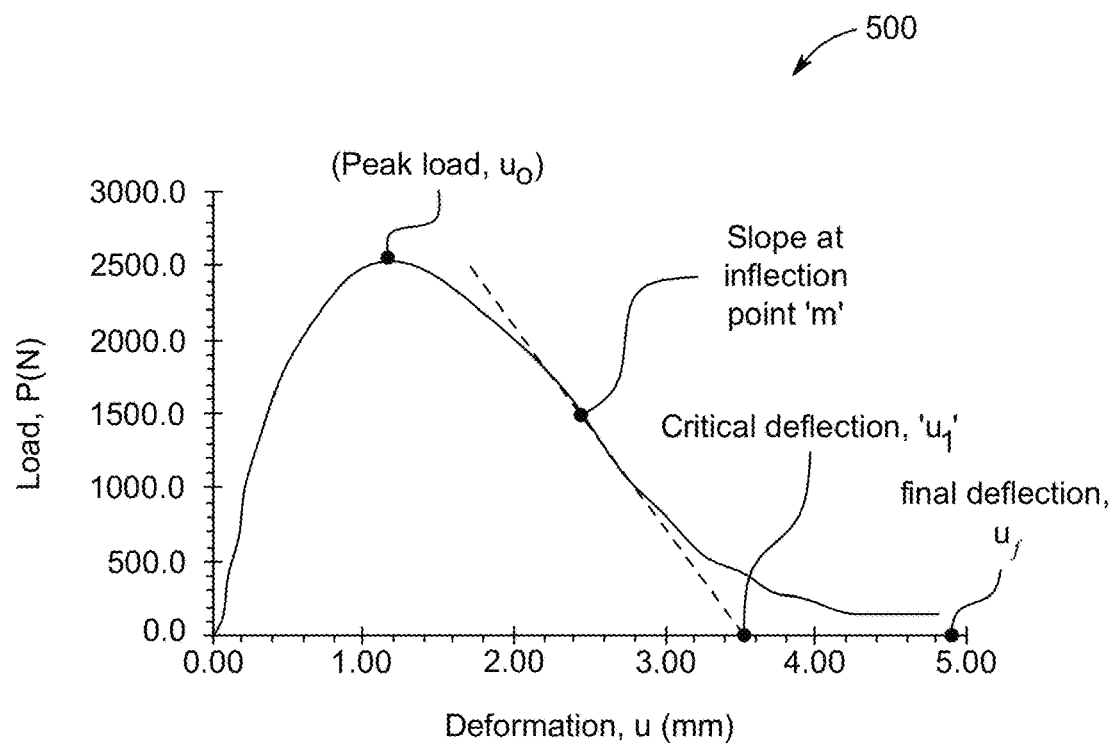
FIG. 5 illustrates a graph showing a typical load-deformation curve of an AC sample subjected to the SCB test, according to certain embodiments.

FIG. 5 illustrates a graph 500 showing a typical load-deformation curve of an AC sample subjected to the SCB test. The work of fracture ($W_f$) is the area under the load-deformation curve and is given by equation (2) below. The final deformation ($u_f$) corresponded with a cut-off load of 0.1 kN [H. Ozer, I. L. Al-Qadi, J. Lambros, A. El-Khatib, P. Singhvi, B. Doll, Development of the fracture-based flexibility index for asphalt concrete cracking potential using modified semi-circle bending test parameters, Constr. Build. Mater. 115 (2016) 390-401; and AASHTO:TP-124, Determining the Fracture Potential of Asphalt Mixtures Using Semicircular Bend Geometry (SCB) at Intermediate Temperature, Am. Assoc. State Highw. Transp. Off. (2016), incorporated herein by reference in their entirety]. The fracture energy ($G_f$) of mixtures was calculated according to equation (3) below. A normalized secant stiffness ($S_n$) of the various AC mixtures was also estimated using equation (5) below. The regular secant stiffness did not account for the slight variations in heights and ligament-lengths of the samples. As a results, it was harmonized for all samples by dividing it with the ligament-area ($Area_{ligament}$), which is shown in equation (4) below. Further, the Flexibility Index (FI) of the AC mixtures was determined using equation (6) below.

$$W_f = \int_{u_o}^{u_f} P(u)du \quad (2)$$

$$G_f = \frac{W_f}{Area_{ligament}} * 10^4 \quad (3)$$

$$Area_{ligament} = t * L_{ligament} \quad (4)$$

$$S_n = \frac{Peak\ load}{U_o * Area_{ligament}} \quad (5)$$

$$FI = \frac{G_f}{|m|} * 0.001 \quad (6)$$

where, the load P is in kN, $W_f$ is in joules, $G_f$ is in joules/m², S is in N/mm², and $u_o$ is in mm.

Rutting Performance Test

Figure 6:
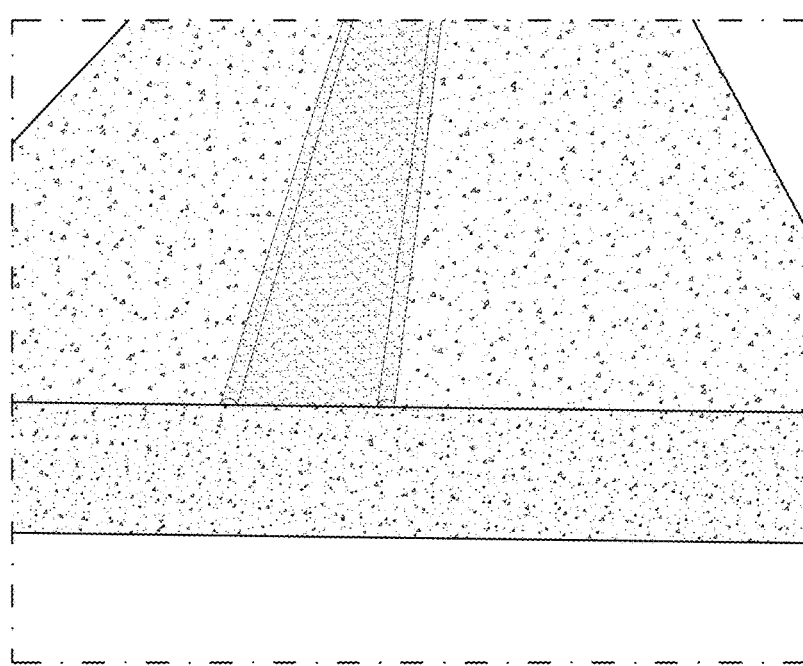
FIG. 6 illustrates a typical tested sample for conducting standard wheel tracking test for bituminous mixtures, according to certain embodiments.

The resistance to permanent deformation of the various RAP containing AC mixtures was analyzed in accordance with standard wheel tracking test for bituminous mixtures (BS_EN_12697-22). FIG. 6 illustrates a typical tested sample on which the test was conducted at 60° C., with wheel speed of 26.5 rpm, under a 15 kg load, for 10,000 cycles. For this purpose, AC slabs of 305 by 305 by 50 mm dimensions having similar density (2.15±0.01 kg/m³) were compacted at 140° C., using 50 cycles. Test samples were pre-condition for 4 hours at the test temperature before initiating the test. Rate of rutting was estimated according to equation (7) below.

$$Rate\ of\ rutting\left(\frac{mm}{10^3 cycles}\right) = \frac{(d_{10,000} - d_{5,000})}{5} \quad (7)$$

where, $d_{10,000}$ is the permanent deformation after 10,000 load cycles, and $d_{5,000}$ is the deformation after 5,000 cycles.

Toxicity Characteristics Leaching Procedure (TCLP) Test

The potential leaching of heavy metals (Hg, Cd, Cr, Pb, Cu, Ni, Zn and Fe) from the samples of the different types of AC was also investigated using the US Environmental Protection Agency Toxicity Characteristic Leaching Procedure (TCLP) [USEPA, United States Environmental Protection Agency Toxicity Characteristics leaching procedure, Method 1311, Test Methods Eval. Solid Waste. (1992), incorporated herein by reference in its entirety]. The TLCP test was performed on leachates which were extracted from the loose AC. The loose-state of the AC was considered more critical because of its higher exposed surface area than the compacted sample, and it represented the end life state of the pavement. After the fracture test, the compacted samples were loosened at 110° C. and allowed to cool. The initial batch of the loose AC samples were mixed with deionized water in 100 mL bottle at solid to water ratio of 1:20 and shaken for one hour. This first step was to establish the pH of the liquid extract. Depending on the resulting decant extract liquid pH, the appropriate TCLP buffer (fluid #1 or fluid #2) was used for further analysis. For pH<5, Fluid #1 (64.3 ml of 1.0 N NaOH and 5.7 ml of glacial acid in 1000 ml deionized water) was used. However, if the pH is >5, fluid #2 (5.7 ml of glacial acid to 1000 ml deionized water) was used instead. Second batches of the loose mixes were then mixed with the appropriate TCLP buffer solution (fluid #1 or fluid #2) also in a liquid-to-solid ratio of 20:1 in sealed bottles and agitated in a rotary extractor for 18 hours at 30 rpm and room temperature. After the 18 hours agitation, the samples were filtered through 0.45 um glass fiber filters and the filtrates defined as TCLP extract were immediately, analyzed for Cd, Cr, Cu, Ni, Pb, Zn and Fe using well-calibrated simultaneous ICP Atomic Emission Spectrometers (ICPE-9800, Shimadzu) as per United States Environmental Protection Agency (USEPA) method 200.7 [T. D. Martin, C. A. Brockhoff, J. T. Creed, E. M. W. Group, United States Environmental Protection Agency Method (USEPA) 200.7, Revision 4.4 (1994) Determination of metals and trace elements in water and wastes by inductively coupled plasma-atomic emission spectrometry, (1994) 1-58, incorporated herein by reference in its entirety]. For Hg, solid sample was analyzed directly using mercury analyzer (Solid Mercury Analyzer SMS 100, Perkin Elmer Inc.) according to EPA Method 7473 with details as reported elsewhere [N. D. Mu'azu, A. Usman, N. Jarrah, O. Alagha, Pulsed Electrokinetic Removal of Chromium, Mercury and Cadmium from Contaminated Mixed Clay Soils, Soil Sediment Contam. 25 (2016) 757-775, incorporated herein by reference in its entirety]. The TCLP tests for all asphalt samples were undertaken in duplicates and the average results against a blank sample are reported herein.

Results

The above mentioned tests provide the Marshall stability, moisture resistance or performance, fracture energy, normalized secant stiffness, flexibility index, resistance to permanent deformation, analysis of variance, the TCPL, and the air pollution measurement results of the rejuvenated pavement.

Figure 7:
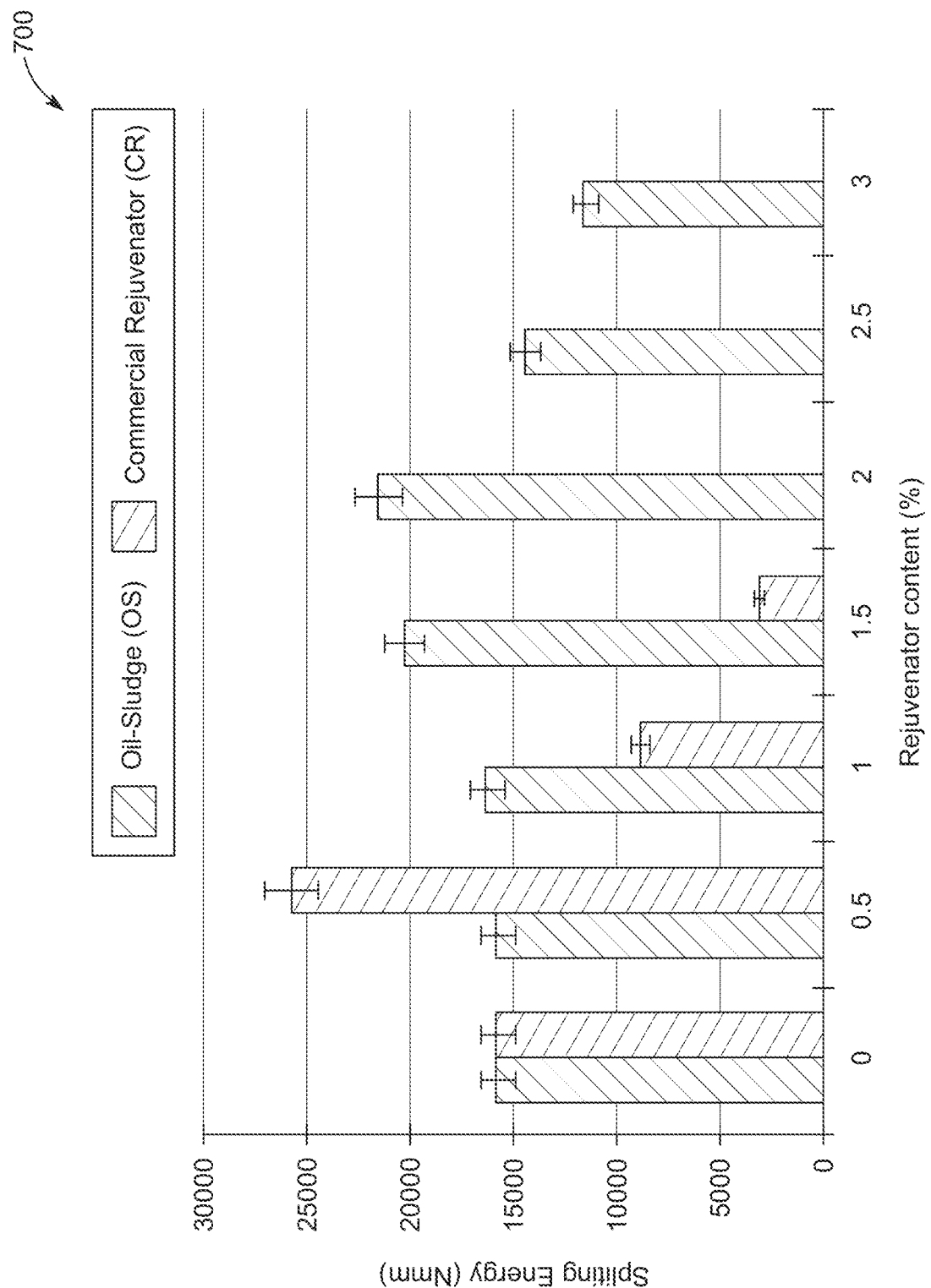
FIG. 7 illustrates a graph showing variation in Splitting Energy (SE) of a 100% RAP rejuvenated with an increasing amount of OS and CR, according to certain embodiments.

FIG. 7 illustrates a graph 700 showing the variation in the Splitting Energy (SE) of 100% RAP that was rejuvenated with an increasing amount of OS and CR. The SE is the area under the load deformation curve of the ITS test. The SE was corrected by applying a linear correction factor with reference a standard sample height of 63.5 mm. It was considered a measure of indirect tensile cohesion and adhesion of the RAP composition. The SE was found to increase with an increase in the rejuvenator content up to a certain level before it begins to decline. The contents of OS and CR that corresponded with the maximum SE were considered comparable.

From the graph 700, it can be seen that 2% of OS and 0.5% of CR by weight of RAP, or 36.3% of OS and 9.1% of CR by weight of asphalt binder in the RAP, corresponded with maximum SE of the RAP. This CR content is in close proximity with optimum rejuvenator contents employed in previous studies [N. H. Tran, T. Adam, R. Willis, Effect of Rejuvenator on HMA Mixtures with High RAP and RAS Contents, AUBURN, 2012; and M. Zaumanis, R. B. Mallick, R. Frank, Determining optimum rejuvenator dose for asphalt recycling based on Superpave performance grade specifications, Constr. Build. Mater. 69 (2014) 159-166, incorporated herein by reference in their entirety]. It may be observed that the RAP requires 4 times the amount of OS as compared to the CR, to be sufficiently revived. This was not un-expected considering that CR is 100% oil and that the dehydrated OS consisted of only 25.7% oil fractions (as discussed above). For similar reason, the CR-rejuvenated RAP showed a slightly higher SE than its OS-rejuvenated counter-part. It should however be noted that this is a 100% RAP AC that has no new asphalt binder or fresh aggregate added. The performance results of the various rejuvenators in mixed-AC are presented in the proceeding paragraphs. The same 2% by weight of RAP was adopted for the Cement-treated OS (CT-OS) rejuvenator.

Result of the Marshall mix design for the fresh asphalt is shown in Table 4 below. The optimum asphalt content was found to be 6.5% at 4% air voids. This asphalt content was adjusted and maintained for AC mixtures containing 20% and 40% RAP according to Asphalt Institute's method [AI, MS-2 Asphalt Mix Design Methods, Asph. Inst. MANUAL SER (1993), incorporated herein by reference in its entirety]. As presented in Table 2, the gradation of the AC mixtures containing 20% and 40% of RAP were controlled and are similar to that of the fresh AC.

TABLE 4

Optimal Asphalt Mix (Fresh) Properties

| Property | Asphalt Content (%) | Marshal Stability (N) | Flow (0.25 mm) | Air voids (%) | VMA (%) | VFA (%) |
|---|---|---|---|---|---|---|
| Value | 6.5 | 15,268 | 14.75 | 4.0 | 14.1 | 69.51 |
| Criteria | — | ≥6672 | 8-16 | 3-5 | ≤14 | — |

Moisture Sensitivity Results

Figure 8A:
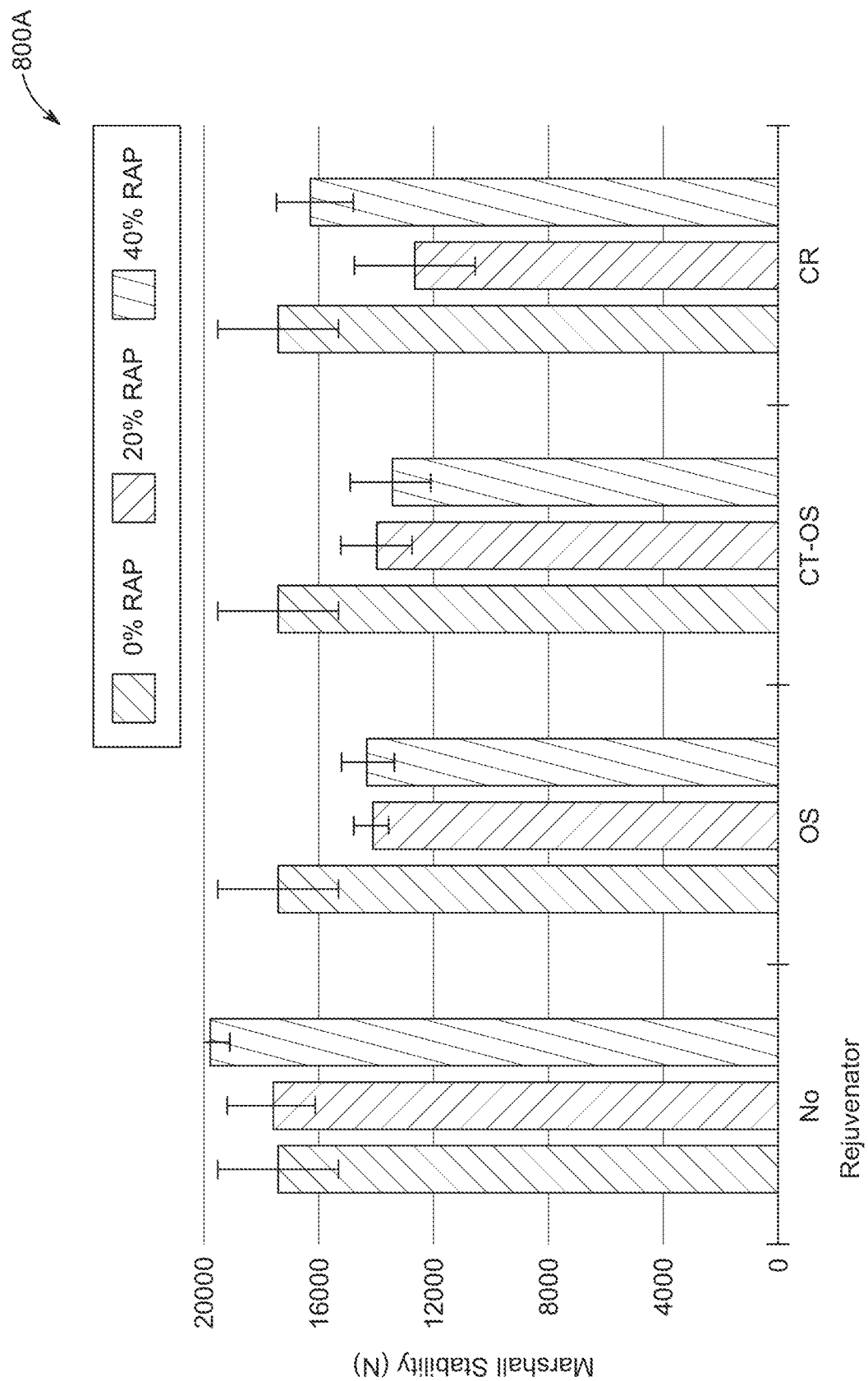
FIG. 8A illustrates a graph showing Marshall stability of various AC mixtures, according to certain embodiments.
Figure 8B:
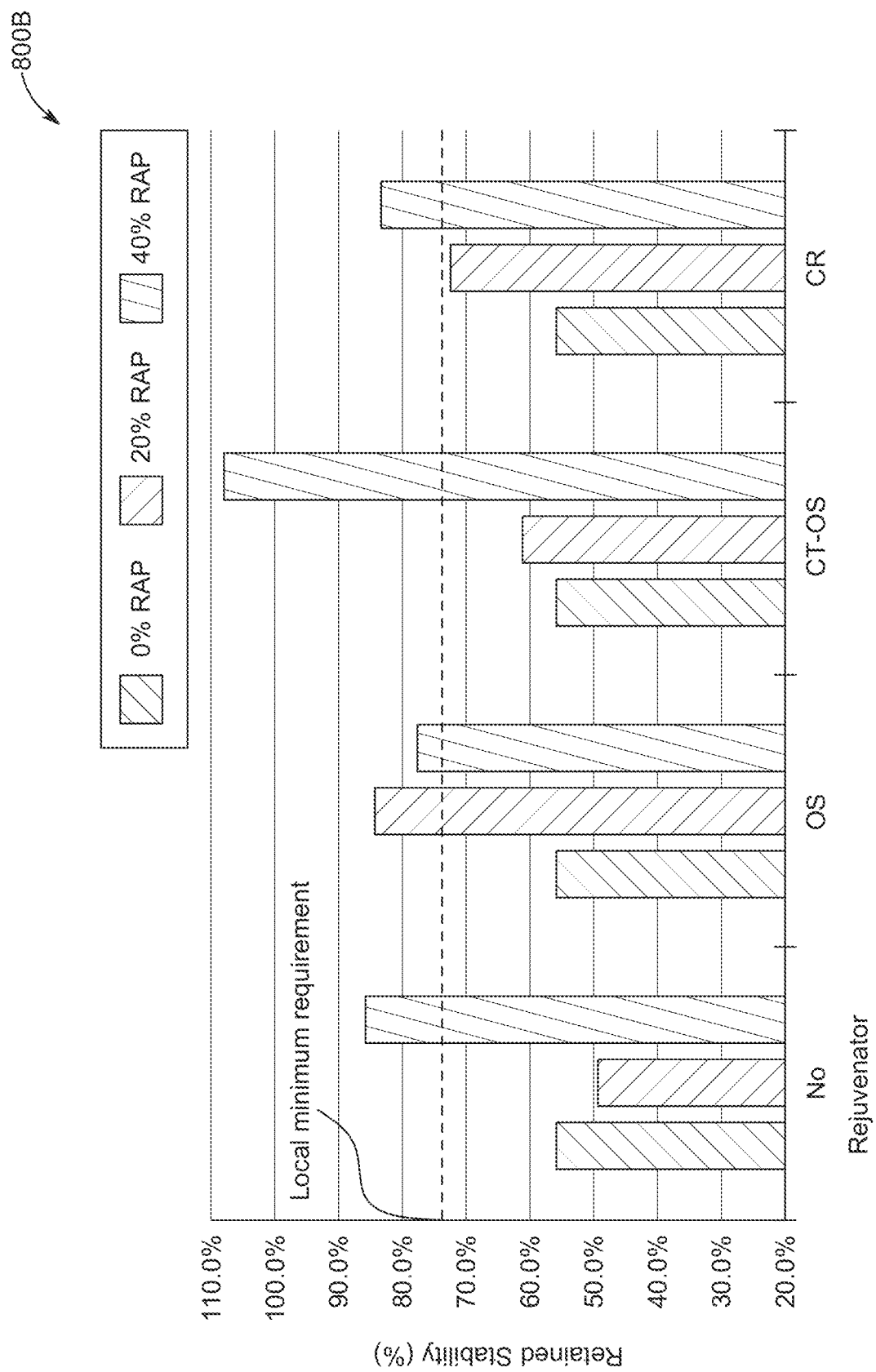
FIG. 8B illustrates a graph showing Retained stability of various AC mixtures, according to certain embodiments.

The Marshall stability and retained stability of the various AC mixtures are presented in FIGS. 8A-8B. As may be seen from a graph 800A of FIG. 8A, the un-rejuvenated AC showed higher stability than the rejuvenated mixtures. This observation is true for both 20% and 40% RAP containing ACs, for OS, CT-OS, and CR rejuvenators. Previous studies have reported similar decline in stability due to addition of rejuvenators to AC mixtures containing RAP [H. Taherkhani, F. Noorian, Laboratory investigation on the properties of asphalt concrete containing reclaimed asphalt pavement and waste cooking oil as recycling agent, Int. J. Pavement Eng. 22 (2021) 539-549, incorporated herein by reference in its entirety]. This is because, addition of the rejuvenators revived the old binder in the RAP by transforming it from stiff and brittle to flexible and ductile. All the RAP containing AC mixtures showed stability well above the minimum requirement. The AC containing OS- and CT-OS rejuvenated RAP showed slightly higher stability than that with CR-rejuvenated RAP at 20% RAP content. On the other hand, the AC mixtures containing CR-rejuvenated RAP showed higher stability at 40% RAP content. This indicates that at higher composition of the RAP, the OS and CT-OS rejuvenators exhibited a higher softening-influence on the AC mix than the CR rejuvenator.

Further, moisture resistance performance of the various AC mixtures is shown in a graph 800B of FIG. 8B. The moisture resistance of the fresh control AC was observed to be poor (below the recommended minimum). But this is not uncommon as premature pavement distresses plaguing the EP of Saudi Arabia were mostly moisture damage-related due to poor aggregate performance. At 20% RAP content, all rejuvenators showed positive impact on the moisture sensitivity of the AC, and the un-rejuvenated AC showed the least moisture resistance. The OS-rejuvenated AC mixture showed the highest moisture resistance at 20% RAP content, followed by CR-rejuvenated AC, then AC with CT-OS-rejuvenated RAP, and finally the un-rejuvenated AC. At 40% RAP content, the CT-OS-rejuvenated AC exhibited superior moisture resistance performance (retained stability >100%). This indicates that the strengthening effect of the OPC in the CT-OS due to hydro-curing manifested at higher RAP content. Previous research has also shown that small amount of OPC can significantly boost the moisture resistance of AC mixtures [AI, MS-2 Asphalt Mix Design Methods, Asph. Inst. MANUAL SER (1993), incorporated herein by reference in its entirety]. In summary, the OS rejuvenator resulted in highest moisture performance at 20% RAP content, while the CT-OS rejuvenator resulted in AC mixtures with the best moisture resistance at 40% RAP content.

Fracture Resistance Results

Figure 9A:
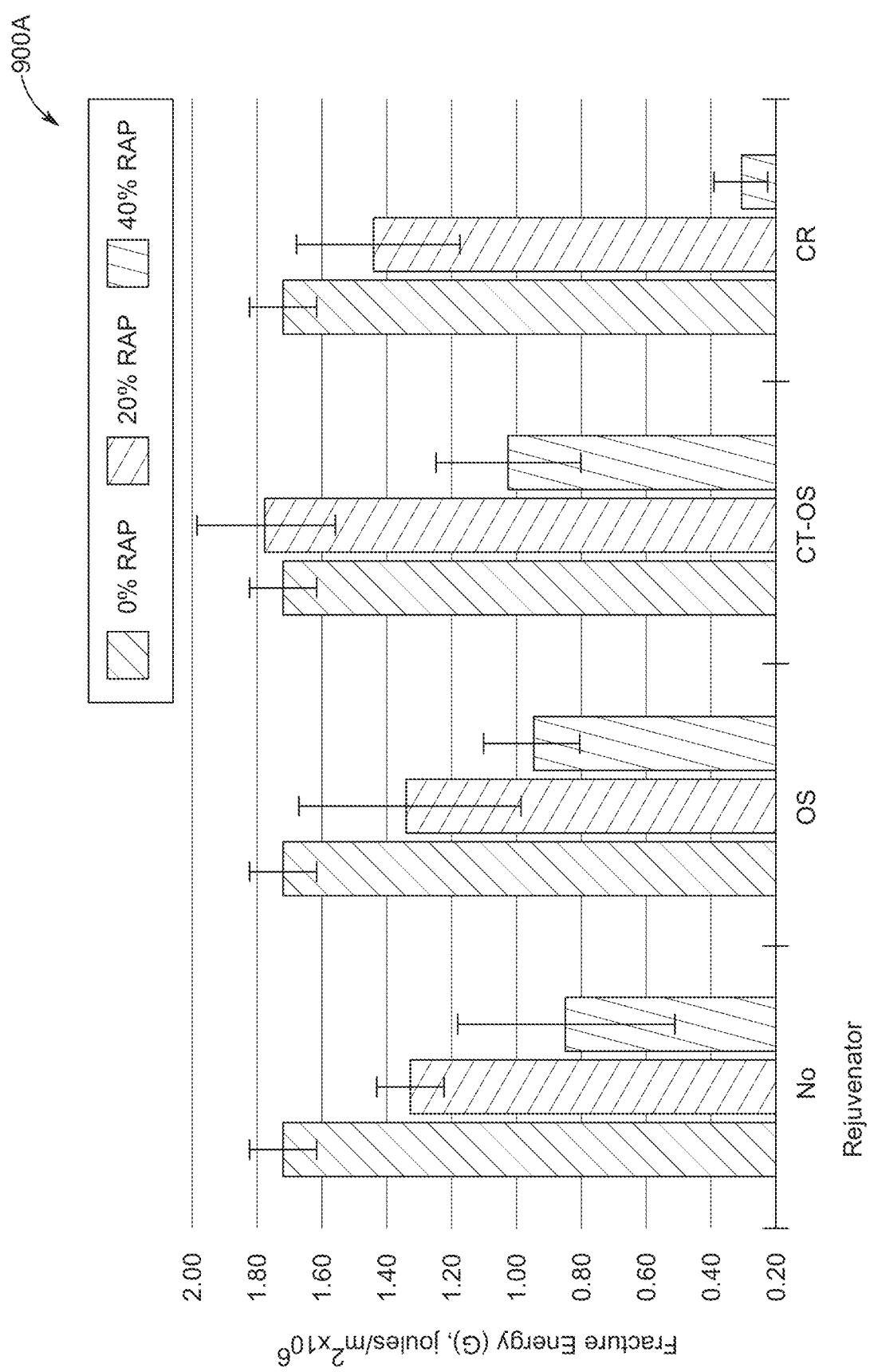
FIG. 9A illustrates a graph showing fracture energy of various AC mixtures containing different rejuvenators and RAP proportions, according to certain embodiments.
Figure 9B:
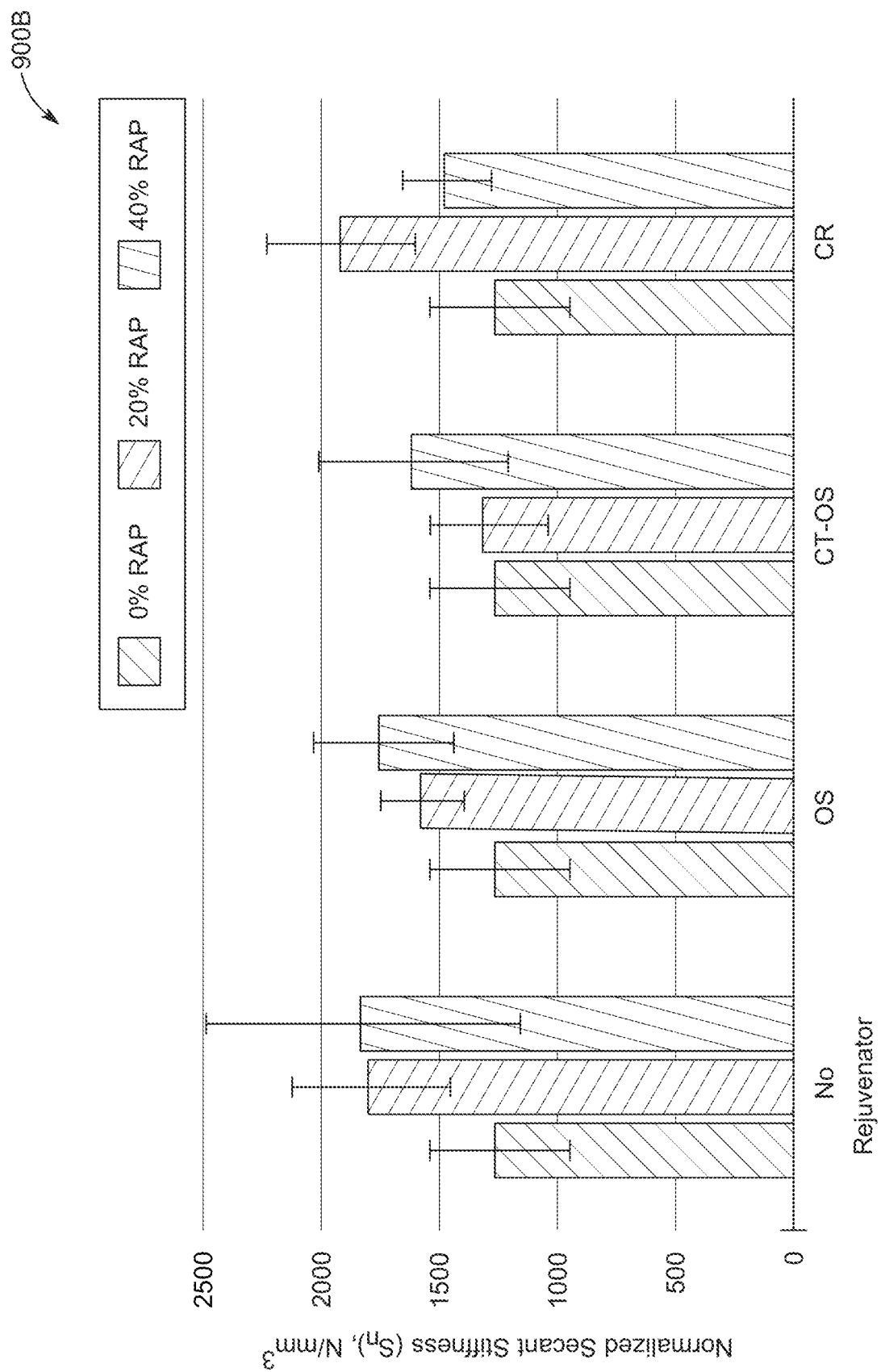
FIG. 9B illustrates a graph showing normalized secant stiffness of various AC mixtures containing different rejuvenators and RAP proportions, according to certain embodiments.

The fracture energy (FE) is a measure of the energy required to sustain continuous crack propagation until failure of the AC. It indicates the level of resistance that a given AC puts before cracking. Generally, an AC with higher FE signifies that it has better crack resistance. FIG. 9A illustrates a graph 900A showing the FE of the various ACs containing different rejuvenators and RAP proportions. The FE was observed to decline with increase in RAP content for most of the ACs. This is because regardless of the rejuvenation, the RAP is old which makes it brittle and less resistant to fracture. Further, as may be seen from a graph 900B of FIG. 9B, AC mixtures with higher RAP content exhibited higher stiffness in general, and in turn lower FE. This was why the fresh AC mix containing 0% RAP showed higher FE except in the case of the CT-OS AC. Oil-rejuvenated RAP can hardly be more efficient than a new AC in fracture or crack resistance, but the CT-OS rejuvenator does contain OPC in addition to oil. The OPC is known to create new and strong bonds in concrete matrix [L. Struble, J. Skalny, S. Mindess, A review of the cement-aggregate bond, Cem. Concr. Res. 10 (1980) 277-286, incorporated herein by reference in its entirety]. As a result, it was the only rejuvenator that yielded AC mix with higher FE than the fresh AC at 20% RAP content. In addition, the CT-OS-rejuvenated AC showed higher FE than all other ACs at 40% RAP content. The CR-rejuvenated AC was the least resistant to fracture at 40% RAP content. Previous studies have reported poor fracture resistance in high-RAP-content ACs that were rejuvenated with petroleum-oil [Baghaee et al. (2016), incorporated herein by reference in its entirety]. In summary, the CT-OS rejuvenator performed better than the OS and CR rejuvenators with respect to fracture-resistance at 20% and 40% RAP content. The OS rejuvenator yielded AC mixture with better resistance to fracture than the CR rejuvenator at 40% RAP content, but not at 20% RAP content.

Figure 10:
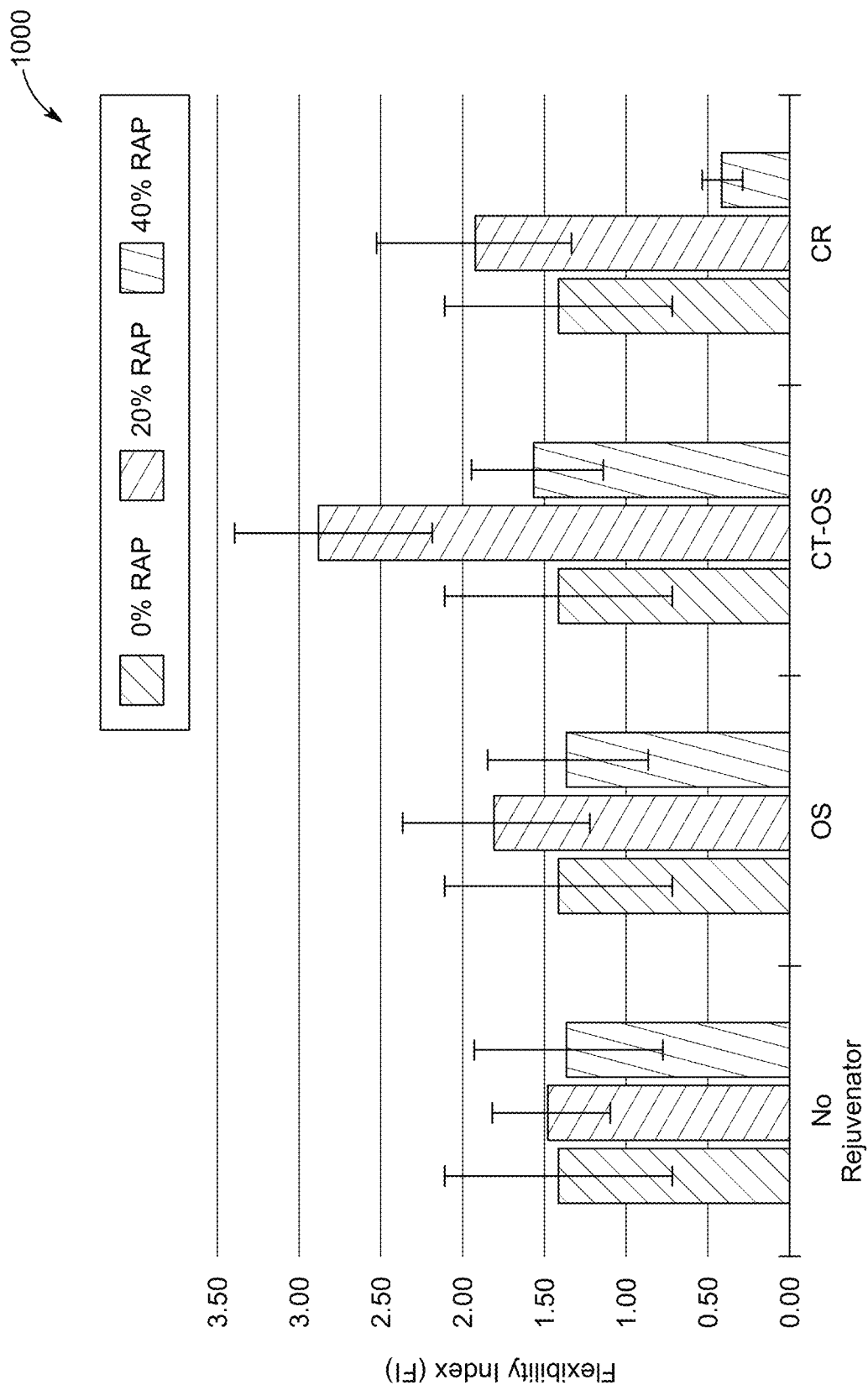
FIG. 10 illustrates a graph showing Flexibility Index (FI) of RAP containing AC mixtures, according to certain embodiments.

Further, FIG. 10 illustrates a graph 1000 showing the Flexibility Index (FI) of the RAP containing AC mixtures. The FI is dimensionless parameter that was shown to successfully identify the fatigue cracking potential of RAP containing AC [H. Ozer, I. L. Al-Qadi, J. Lambros, A. El-Khatib, P. Singhvi, B. Doll, Development of the fracture-based flexibility index for asphalt concrete cracking potential using modified semi-circle bending test parameters, Constr. Build. Mater. 115 (2016) 390-401, incorporated herein by reference in its entirety]. Higher FI value indicates better fatigue cracking resistance. It was found that AC mixtures with FI values less than 2.0 showed poor fatigue performance. Accordingly, it can be said that the AC containing CT-OS rejuvenated RAP exhibited the highest fatigue resistance potential at 20% RAP content. The AC containing 20% RAP that was rejuvenated with CT-OS showed better fatigue resistance potential than the fresh AC. Higher RAP content (40%) resulted in higher fatigue cracking potential regardless of the RAP-rejuvenation.

Rutting Resistance Results

Figure 11:
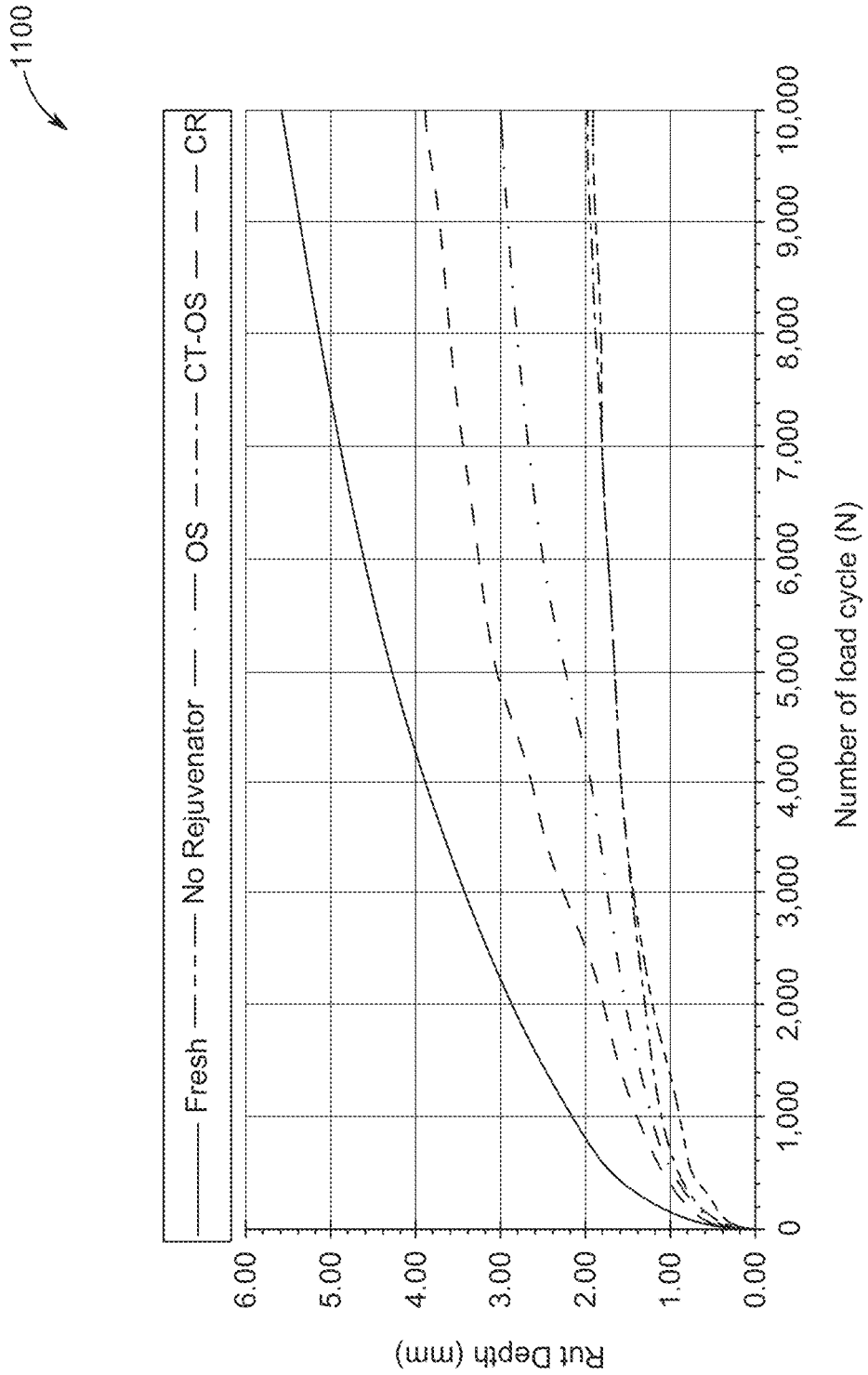
FIG. 11 illustrates a graph showing permanent deformation curves of various AC mixtures versus number of load repetitions, according to certain embodiments.

FIG. 11 illustrates a graph 1100 showing permanent deformation curves of the various AC mixtures versus number of load repetitions at 40% RAP content. AC mixes that contained 40% RAP were selected as critical mixtures because even the fresh control-AC met the minimum threshold of 0.25 inches or 6.35 mm rut depth. And all the remaining AC mixtures showed lower permanent deformation than the fresh AC.

Figure 12A:
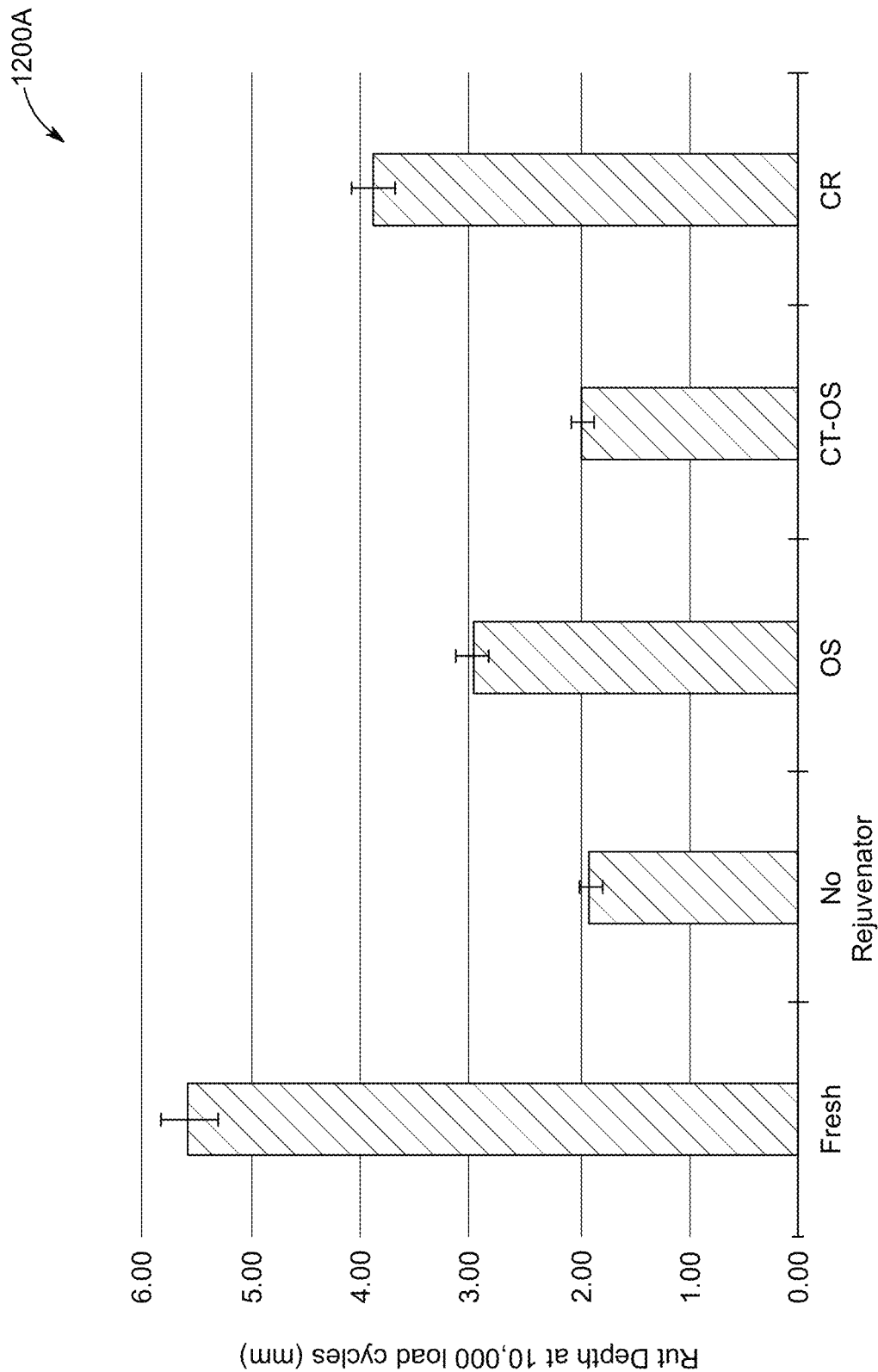
FIG. 12A illustrates a graph showing rut depth for various AC mixtures, according to certain embodiments.
Figure 12B:
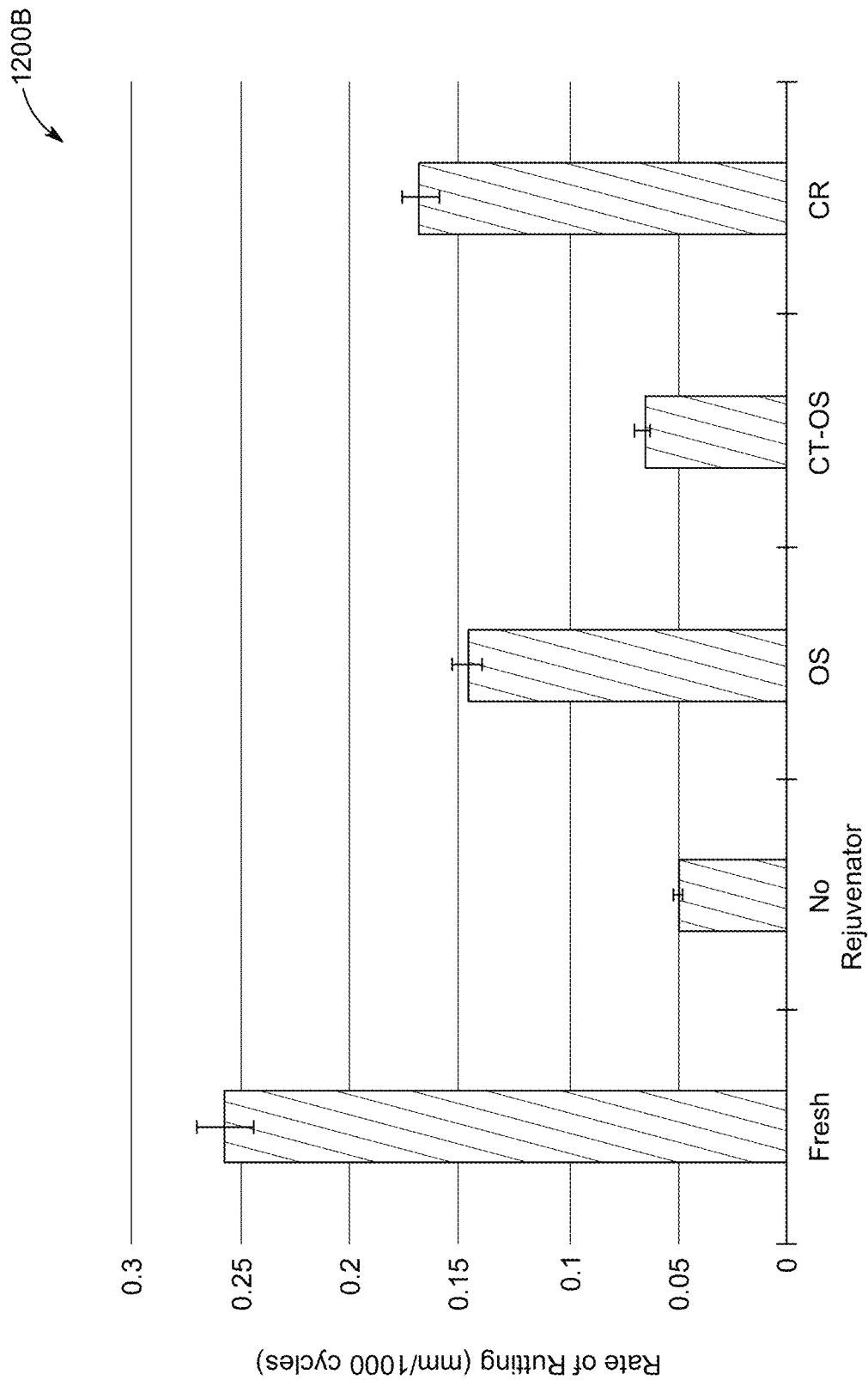
FIG. 12B illustrates a graph showing rate of rutting for various AC mixtures, according to certain embodiments.

Further, FIG. 12A illustrates a graph 1200A showing rut depth for various AC mixtures. As shown, AC mixtures from those that sustained highest to lowest permanent deformation is as follows: fresh AC (0% RAP), CR-rejuvenated AC, OS-rejuvenated AC, CT-OS-rejuvenated AC, and the un-rejuvenated AC. Some previous studies have reported significant increase in permanent deformation due to high content of rejuvenator [Jia et al. (2015), incorporated herein by reference in its entirety]. But it was also reported that careful selection of rejuvenator dosage can yield an AC with good rutting performance [Zeng et al. (2018), incorporated herein by reference in its entirety]. Similarly, in the present disclosure, the rejuvenator contents were pre-determined based on SE and as such no excessive rejuvenation occurred. FIG. 12B illustrates a graph 1200B showing rate of rutting for various AC mixtures. As shown, asphalt mixes with a higher rate of rutting showed higher rutting. In summary, the CT-OS-rejuvenated AC mixture showed better rutting resistance than the OS- and the CR-rejuvenated ACs, and the OS-rejuvenated mix was more resistant to rutting than the CR-rejuvenated AC.

Statistical Analysis

Analysis of variance was utilized to check how significant the content levels of the RAP and the types of rejuvenator affected key properties of the AC, at a 5% significance level. The analyzed properties include Marshall stability, Flexibility Index (FI), Fracture Energy (FE), and normalized Secant Stiffness ($S_n$). Other properties like retained stability, permanent deformation, and heavy-metal leaching were not included because they have clear and standardized acceptable threshold values. Shapiro-Wilk test was used to check the assumption that the analyzed properties follow normal distribution.

The hot mix AC containing three levels of RAP (0%, 20%, and 40%) that were rejuvenated with oil sludge (OS), cement treated OS (CT-OS), and commercial rejuvenator (CR) were analyzed. Splitting energy of 100% rejuvenated RAP was used to select comparable rejuvenation levels. The Marshall stability, moisture resistance, fracture resistance, and resistance to permanent deformation of the RAP containing AC were studied. Results showed that AC containing OS-rejuvenated RAP demonstrated better moisture resistance than all the studied ACs at 20% RAP content, while CT-OS-rejuvenated AC showed the highest moisture resistance at 40% RAP content. In general, incorporation of the OS rejuvenators to the RAP containing AC resulted in higher fracture resistance. AC containing 20% RAP that was rejuvenated with CT-OS showed the best fatigue resistance potential according to its flexibility index. The AC containing OS and CT-OS-rejuvenated RAP showed better resistance to permanent deformation than the fresh and CR-rejuvenated AC mixtures. The concentrations of the heavy metals in the OS RAJ were far below the US-EPA toxicity characteristics leachate procedure (TCLP) thresholds. This suggests that application of OS as rejuvenator in RAP containing ACs is environmentally feasible.

FIGS. 13A-13D provide Quantile-Quantile (Q-Q) plots of the residuals for the studied properties. In particular, FIG.

Figure 13B:
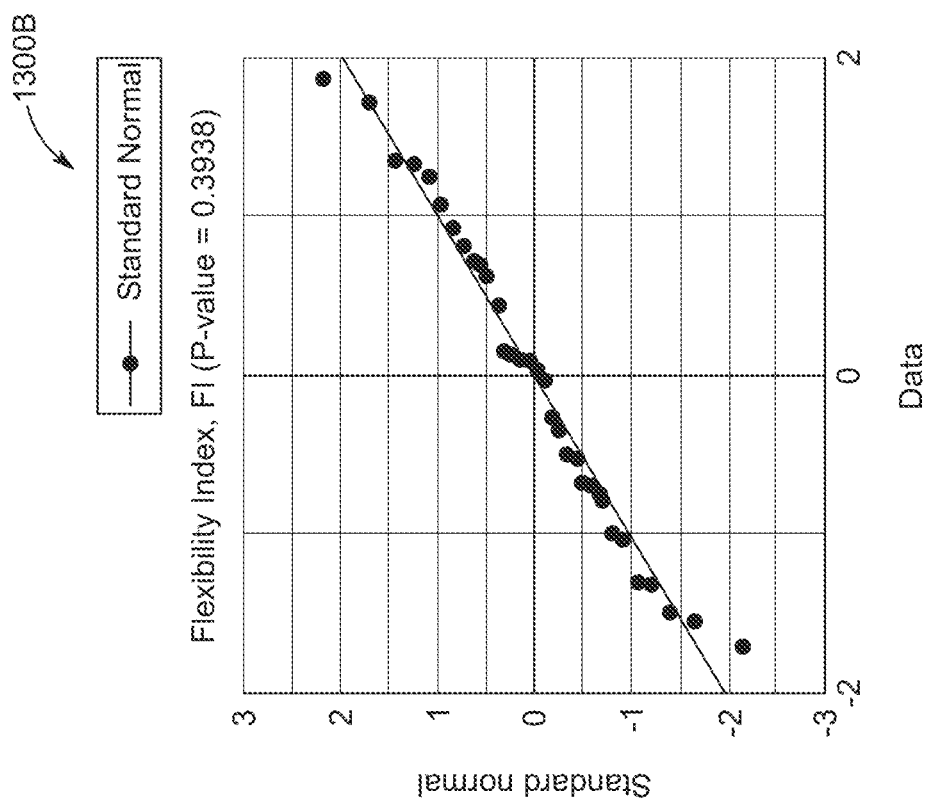
FIG. 13B illustrates a Quantile-Quantile plot showing Flexibility Index against standard normal, according to certain embodiments.
Figure 13A:
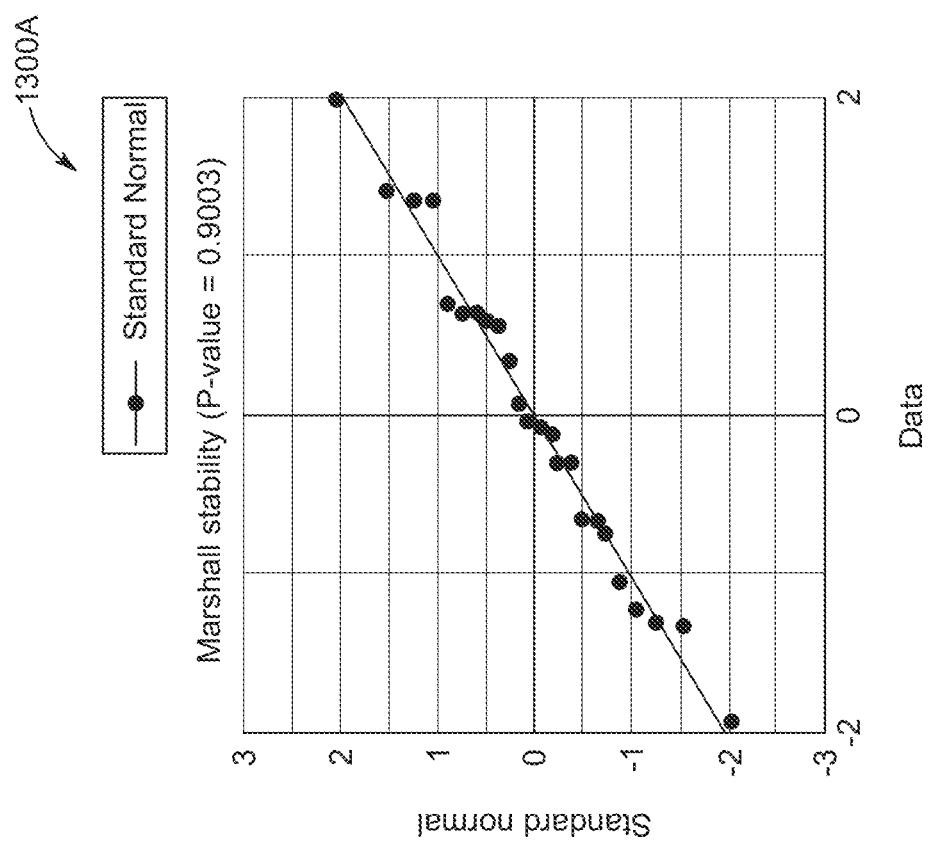
FIG. 13A illustrates a Quantile-Quantile plot showing Marshall stability against standard normal, according to certain embodiments.
Figure 13D:
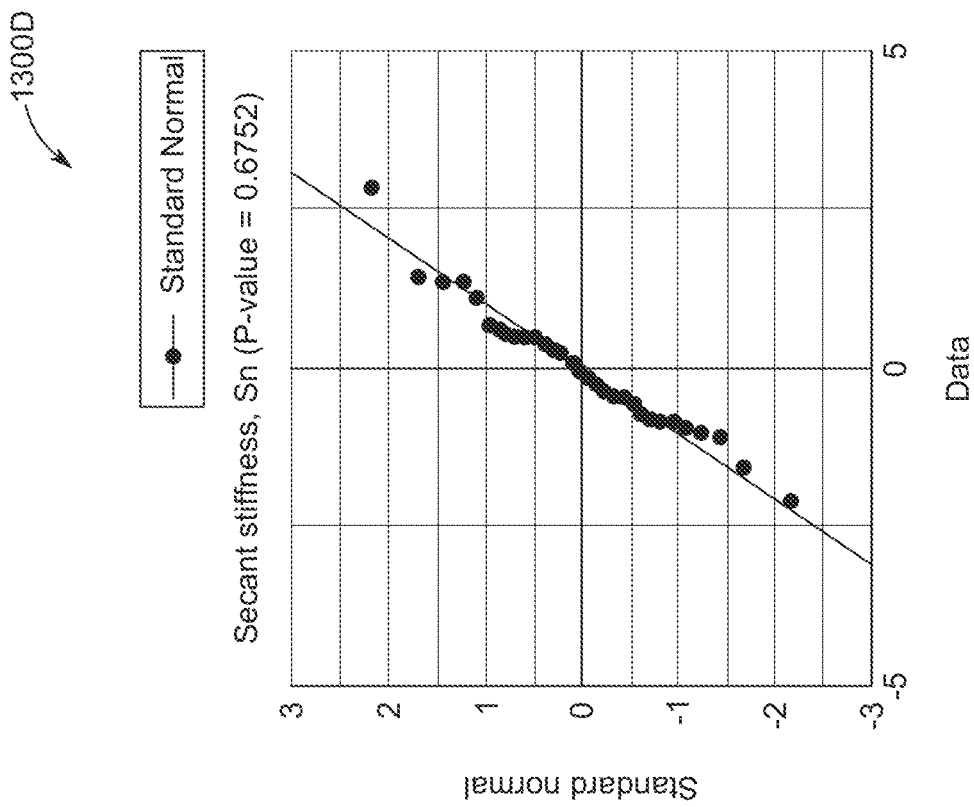
FIG. 13D illustrates a Quantile-Quantile plot showing secant stiffness against standard normal, according to certain embodiments.
Figure 13C:
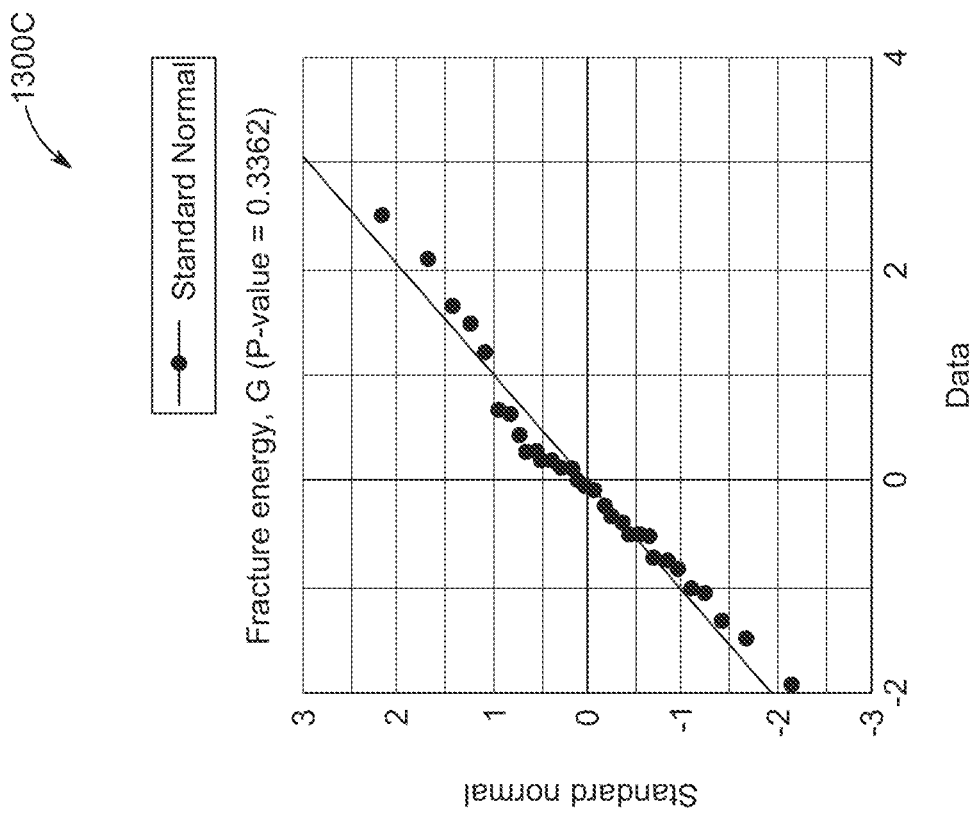
FIG. 13C illustrates a Quantile-Quantile plot showing Fracture energy against standard normal, according to certain embodiments.

13A illustrates a Q-Q plot 1300A showing Marshall stability against standard normal; FIG. 13B illustrates a Q-Q plot 1300B showing Flexibility Index against standard normal; FIG. 13C illustrates a Q-Q plot 1300C showing Fracture energy against standard normal; and FIG. 13D illustrates a Q-Q plot 1300D showing secant stiffness against standard normal. Based on the observed P-values, all the studied properties fit the normal distribution (P-values >0.05). This further validates the inferences made from the result of the ANOVA (by Cargill®) shown in Table 5 below. The effect of the RAP-content as observed in Marshall stability, FE, and FI of the AC is statistically significant (P-value <0.05). Similarly, the differential effects of the various rejuvenators on the AC's Marshall stability, FE, and FI are also significant (P-value <0.05). There was a significant interactive effect between the RAP-content and the type of rejuvenator, on the FE and the FI. This means that the effect of the RAP content on the FE and the FI significantly depends on the type of the rejuvenator. On the other hand, effect of the RAP-content and the type of rejuvenator on the $S_n$ was not found to be significant (P-value >0.05). This implies that a minor change in the $S_n$ could mean a significant change in the FE of the RAP containing AC. Thereby, the changes in $S_n$ of the AC was valuable in understanding the reason behind the observed changes in the FE.

States Environmental Protection Agency Toxicity Characteristics leaching procedure, Method 1311, Test Methods Eval. Solid Waste. (1992), incorporated herein by reference in its entirety]. The insignificant difference in the concentration of the leached heavy metal from the various RAP-ACs could be due to the fact that a single mixing bowl was employed for preparation. This might have led to some contamination of the RAP-AC with no OS. Another explanation for the presence of Cr and Fe in all RAP containing ACs is that the RAP is a product of milling and might contain traces of metallic wear from the milling drum. But overall, the results clearly show that all the heavy metals concentration in the leachate are lower than the respective maximum allowable limit set by the US-EPA. The concentrations were far below the thresholds and when compared with the concentration in the fresh sample, it implies that there was an excellent stabilization of the various asphalt concretes, including those having OS and CT-OS. This suggest that the application of the oil sludge as an additive to RAP is safe and may not result significant leaching of heavy metals into the environment. Moreover, the EDX analysis presented in FIG. 3A (as discussed above) is well corroborated with the TCLP results, which implies the low presence of most heavy metals in the OS.

TABLE 5

Analysis of variance of the effects of RAP-content and rejuvenator-type

| | Factors | DF | Sum of Square (SS) | Mean Square (MS) | F Statistic (df1, df2) | P-value |
|---|---|---|---|---|---|---|
| Marshall stability | RAP content (A) | 1 | 7664383.49 | 7664383.49 | 5.0630 (1,16) | 0.03887* |
| | Rejuvenator type (B) | 3 | 99055795.75 | 33018598.58 | 21.8116 (3,16) | 0.00001* |
| | Interaction AB | 3 | 14192603.28 | 4730867.76 | 3.1251 (3,16) | 0.05517 |
| | Error | 16 | 24220954.78 | 1513809.67 | | |
| | Total | 23 | 145133737.30 | 6310162.49 | | |
| Marshall stability | RAP content (A) | 1 | 5.0642 | 5.0642 | 22.6604 (1,24) | 0.00008* |
| | Rejuvenator type (B) | 3 | 3.9199 | 1.3066 | 5.8467 (3,24) | 0.00380* |
| | Interaction AB | 3 | 2.4777 | 0.8259 | 3.6956 (3,24) | 0.02561* |
| | Error | 24 | 5.3635 | 0.2235 | | |
| Fracture Energy (FE) | Total | 31 | 16.8252 | 0.5428 | | |
| | RAP content (A) | 1 | 3.5511 | 3.5511 | 65.5036 (1,24) | <0.00001 |
| | Rejuvenator type (B) | 3 | 1.0120 | 0.3373 | 6.2227 (3,24) | *0.00280 |
| | Interaction AB | 3 | 0.6556 | 0.2185 | 4.0313 (3,24)* | |
| | Error | 24 | 1.3011 | 0.0542 | 0.01867* | |
| | Total | 31 | 6.5199 | 0.2103 | | |
| Secant Stiffness($S_n$) | RAP content (A) | 1 | 1882.3714 | 1882.3714 | 65.5036 (1,24) | <0.00001 |
| | Rejuvenator type (B) | 3 | 294343.4526 | 98114.4842 | 6.2227 (3,24) | *0.00280 |
| | Interaction AB | 3 | 391606.5688 | 130535.5229 | 4.0313 (3,24) | * |
| | Error | 24 | 3178471.9240 | 132436.3302 | 0.01867* | |
| | Total | 31 | 3866304.3170 | 124719.4941 | | |

*Statistically significant factor

Heavy Metal Leaching Analysis

The average measured concentrations of heavy metals (Hg, Cd, Cr, Pb, Cu, Ni, Zn and Fe) leachates generated in the TCPL test from the different asphalt samples, fresh asphalt and RAP with different rejuvenators are provided in Table 6 below. It was observed that leachates from all mixes containing RAP have some concentration of heavy metals. These concentrations were compared against the US-EPA acceptable TCLP thresholds concentrations [USEPA, United

TABLE 6

TCLP tests results for fresh and RAP-ACs with different rejuvenators

| | Average heavy metal, mg/L | | | | | | | |
|---|---|---|---|---|---|---|---|---|
| Sample Name | Hg | Cd | Cr | Pb | Cu | Ni | Zn | Fe |
| Fresh Asphalt | 0.003 | 0.006 | 0.131 | 0.000 | 0.020 | 0.000 | 0.019 | 0.215 |
| 20% RAP NO REJ | 0.002 | 0.048 | 0.729 | 0.538 | 0.068 | 0.204 | 0.154 | 0.739 |

TABLE 6-continued

TCLP tests results for fresh and RAP-ACs with different rejuvenators

| Sample Name | Average heavy metal, mg/L | | | | | | | |
|---|---|---|---|---|---|---|---|---|
| | Hg | Cd | Cr | Pb | Cu | Ni | Zn | Fe |
| 20% RAP-CR | 0.002 | 0.047 | 0.760 | 0.489 | 0.065 | 0.114 | 0.121 | 0.379 |
| 20% RAP-OS | 0.002 | 0.043 | 0.642 | 0.512 | 0.075 | 0.178 | 0.244 | 0.664 |
| 20% RAP-CT-OS | 0.004 | 0.045 | 0.719 | 0.580 | 0.061 | 0.222 | 0.126 | 0.345 |

In the present disclosure, the hot mix AC containing three levels of RAP (0%, 20%, and 40%) that were rejuvenated with oil sludge (OS), cement treated OS (CT-OS), and commercial rejuvenator (CR) were analyzed. Splitting energy of 100% rejuvenated RAP was used to select comparable rejuvenation levels. The Marshall stability, moisture resistance, fracture resistance, and resistance to permanent deformation of the RAP containing AC were studied. Results showed that AC containing OS-rejuvenated RAP demonstrated better moisture resistance than all the studied ACs at 20% RAP content, while CT-OS-rejuvenated AC showed the highest moisture resistance at 40% RAP content. Incorporation of the OS rejuvenators to the RAP containing AC resulted in higher fracture resistance. AC containing 20% RAP that was rejuvenated with CT-OS showed the best fatigue resistance potential according to its flexibility index. The AC containing OS and CT-OS-rejuvenated RAP showed better resistance to permanent deformation than the fresh and CR-rejuvenated AC mixtures. The concentrations of the heavy metals in the OS RAJ were far below the US-EPA toxicity characteristics leachate procedure (TCLP) thresholds. This suggests that application of the OS as rejuvenator in RAP containing ACs is environmentally feasible.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of rejuvenating reclaimed asphalt pavement (RAP), the method comprising:
mixing RAP, oil sludge, at least one asphalt binder, and at least one aggregate at a temperature in a range of from 100 to 200° C. to form a mixture; and
compacting the mixture to form a rejuvenated paving material,
wherein the oil sludge comprises water in a range of from 60 to 80 wt. %, sediments in a range of from 10 to 30 wt. %, and hydrocarbon oils in a range of from 5 to 30 wt. %, based on a total weight of the oil sludge,
wherein the mixture comprises the oil sludge in a range of from 1.5 to 2 wt. %, based on a total weight of the RAP,
wherein the at least one asphalt binder is at least one selected from the group consisting of PG58-22, PG64-10, PG64-16, PG64-28, and PG70-10, the at least one asphalt binder being present in a range of from 20 to 25 wt. %, based on the total weight of the RAP,
wherein the at least one aggregate is at least one selected from the group consisting of limestone, granite, syenite, diorite, basalt, diabase, and gabbro, sandstone, chert, shale, gneiss, schist, slate, quartzite, marble, and serpentine, a balance of the mixture being the at least one aggregate and new asphalt pavement,
wherein the mixture comprises the RAP in a range of from 20 to 40 wt. %, based on a total weight of the mixture, and
wherein the rejuvenated paving material has a retained Marshall stability of in a range of from 75 to 85%, the retained Marshall stability being measured according to AASHTO: T245 (2019) on a first set of 3 samples being saturated and conditioned at 60° C. in water bath for 35 minutes prior to measuring Marshall stability, a second set of 3 samples of the same AC-mix being subjected to saturation and conditioning at 60° C. in water bath for 24 hours, the Marshall stability of the second set of samples being measured and corrected according to heights of the 3 samples according to equation (1):

$$RS = \frac{MS_f}{MS_o} \times 100, \quad (1)$$

wherein an average corrected stability of the first set of samples is $M_S$ an average corrected stability of the second set of samples is $MS_f$, and the retained Marshall stability is RS.

2. The method of claim 1, wherein the sediments in the oil sludge are sulfur, calcium oxide, iron rust, and copper oxide.

3. The method of claim 1, wherein the sediments in the oil sludge have sulfur in a range of from 1 to 15 wt %, calcium oxide in a range of from 25 to 50 wt. %, iron rust in a range of from 5 to 25 wt. %, and copper oxide in a range of from 5 to 25 wt. %, based on the total weight of the sulfur, calcium oxide, iron rust, and copper oxide.

4. The method of claim 1, wherein the oil sludge comprises carbon, hydrogen, oxygen, sulfur, calcium, iron, sodium, magnesium, silicon, chlorine, mercury, copper, bromine, molybdenum, vanadium, cadmium, chromium, lead, zinc, and nickel.

5. The method of claim 1, wherein the oil sludge further comprises nickel in a range of from 1 to 8000 mg, per kg of the oil sludge.

6. The method of claim 1, wherein the oil sludge further comprises vanadium in a range of from 1 to 100 mg, per kg of the oil sludge.

7. The method of claim 1, wherein the at least one aggregate is at least one selected from the group consisting of limestone, granite, syenite, diorite, basalt, diabase, and gabbro.

8. The method of claim 1, wherein the rejuvenated paving material leaches less than 5 mg/L of mercury, cadmium, chromium, lead, copper, nickel, zinc, and/or iron.

9. The method of claim 1, wherein the RAP has an average asphalt binder content of 5.5±0.5%.

10. The method of claim 9, wherein the RAP is obtained from a pavement initially comprising a PG64-10 asphalt binder and a limestone aggregate.

11. The method of claim 10, wherein the oil sludge comprises the water in 69 wt. %, the sediments in 23 wt. %, and the hydrocarbon oils in 8 wt. %,
wherein the sediments are sulfur, calcium oxide, iron rust, and copper oxide, and
wherein the oil sludge comprises carbon, hydrogen, oxygen, sulfur, calcium, iron, sodium, magnesium, silicon, chlorine, mercury, copper, bromine, molybdenum, vanadium, cadmium, chromium, lead, zinc, and nickel.

12. The method of claim 11, wherein the at least one aggregate is limestone.

13. The method of claim 12, wherein the at least one asphalt binder is a PG64-10 asphalt binder.

14. The method of claim 13, comprising 20 wt. % of the RAP, based on a total weight of the mixture, and
wherein the retained Marshall stability is 85%.

15. The method of claim 13, comprising 40 wt. % of the RAP, based on a total weight of the mixture, and
wherein the retained Marshall stability is 75%.

* * * * *